United States Patent
Mitra et al.

(10) Patent No.: US 12,480,962 B2
(45) Date of Patent: Nov. 25, 2025

(54) CONNECTED SYSTEMS FOR AUTOMATED TISSUE SECTION PREPARATION AND METHODS OF USE THEREOF

(71) Applicant: Clarapath, Inc., Hawthorne, NY (US)

(72) Inventors: Partha P. Mitra, Hawthorne, NY (US); Charles Cantor, Hawthorne, NY (US); Baris Yagci, Hawthorne, NY (US); Jonathan Gardi, Hawthorne, NY (US); Dmitry Khavulya, Hawthorne, NY (US)

(73) Assignee: Clarapath, Inc., Hawthorne, NY (US)

( * ) Notice: Subject to any disclaimer, the term of this patent is extended or adjusted under 35 U.S.C. 154(b) by 918 days.

(21) Appl. No.: 17/702,598

(22) Filed: Mar. 23, 2022

(65) Prior Publication Data

US 2022/0308077 A1    Sep. 29, 2022

Related U.S. Application Data

(60) Provisional application No. 63/164,795, filed on Mar. 23, 2021.

(51) Int. Cl.
*G01N 1/00*    (2006.01)
*G01N 1/06*    (2006.01)
(Continued)

(52) U.S. Cl.
CPC ......... *G01N 35/00029* (2013.01); *G01N 1/06* (2013.01); *G01N 1/286* (2013.01);
(Continued)

(58) Field of Classification Search
None
See application file for complete search history.

(56) References Cited

U.S. PATENT DOCUMENTS

2016/0245833 A1   8/2016  Lefebvre
2021/0063288 A1*  3/2021  Mitra ................ G01N 1/2813

FOREIGN PATENT DOCUMENTS

WO    20200094771 A1    5/2020

OTHER PUBLICATIONS

International Search Report; PCT/US22/21601; Dated: Jun. 10, 2022; By: Authorized Officer: Kari Rodriquez.

* cited by examiner

*Primary Examiner* — Jyoti Nagpaul
(74) *Attorney, Agent, or Firm* — Greenberg Traurig, LLP; David J. Dykeman; Roman Fayerberg

(57) ABSTRACT

Systems and methods enable fully automated tissue processing using tissue processing components for producing tissue sections from a tissue sample block and to transfer the tissue sections to slides. A control device queries a Laboratory Information Management System (LIMS) with a sample identifier associated with the tissue sample block and receives tissue sample data from the LIMS. The control device generates tissue processing workflow parameters based on the tissue sample data for each tissue processing component to perform an automated tissue processing workflow. The control device automatically controls each tissue processing component according to the tissue processing workflow parameters to process the tissue sample block. The control device generates a block processing update message while the tissue sample block is processed and communicates the block processing update message to the LIMS to enable the LIMS to track the automated tissue processing workflow for the tissue sample block.

20 Claims, 16 Drawing Sheets

Identify sample block at the automated processing device

Connect to a LIMS to query processing protocols for the sample block

Automatically control the automated processing device according to the processing protocols to section the sample block Return status updates for the processing of the sample block to the LIMS

(51) Int. Cl.
*G01N 1/28* (2006.01)
*G01N 35/00* (2006.01)
(52) U.S. Cl.
CPC .................. *G01N 35/00603* (2013.01); *G01N 2001/2873* (2013.01)

CONNECTED SYSTEMS FOR AUTOMATED TISSUE SECTION PREPARATION AND METHODS OF USE THEREOF

CROSS-REFERENCE TO RELATED APPLICATIONS

The present application claims the benefit of and priority to U.S. Provisional Application No. 63/164,795 filed on Mar. 23, 2021, which is incorporated herein by reference in its entirety.

FIELD OF TECHNOLOGY

The present disclosure generally relates to connected and automated systems configured for tissue section preparation. In particular, the present disclosure provides systems and methods for interfacing an automated tissue processing device with laboratory information services for generation and performance of automated protocol workflows, as well as with device management servers to communicate consumable, predictive maintenance, and usage statistics to increase device performance and reduce downtime.

BACKGROUND OF TECHNOLOGY

Microtomy is the production from a sample block of postage-stamp sized, micron-thin tissue sections for microscope viewing. In the process, a series of tissue sections is cut by a microtome from a sample block and are transferred and mounted to microspore slides for further processing.

Each sample block is associated with specific processing protocols or parameters based on the tests that need to be performed on the tissue samples from the sample block. For example, the processing protocol can provide information about the number and size of the tissue sections to be prepared for a particular test. The processing protocol is typically defined manually by matching accession information for the sample block with accession information in a laboratory information system (LIS) or laboratory information management system (LIMS). However, a mismatch in the accession information could easily lead to misdiagnoses, incorrectly sectioned samples and other costly errors. Moreover, individually inputting each processing protocol for each section requires the histotechnician must devote tremendous time and effort manually setting sectioning information according to sample block barcodes.

SUMMARY

The present disclosure overcomes the problems and deficiencies of the current workflow by the implementation of methods and systems that directly interface the tissue processing systems with the LIS and/or LIMS to enable access and querying of sample block data and processing protocol data. Thus, automated implementation of tissue section processing including tissue sample handling, processing, preparation, sectioning and transfer to tissue section slides may be implemented, where sectioning of a tissue sample is performed by cutting tissue sections from the tissue sample block according to predefined processing protocols. In this manner, a tissue sample block is provided with a barcode. Accession or sample identification of the tissue sample block may be extracted from the barcode and used to query a LIS and/or LIMS (hereinafter referred to in the conjunctive and the alternative as "LIMS"). In some embodiments, real-time updates regarding tissue sections are communicated to the laboratory information management system to update tissue sample block data and patient data.

In some aspects, the techniques described herein relate to a system including: one or more tissue processing components configured to produce one or more tissue sections from a tissue block and to transfer the one or more tissue sections from the tissue block to one or more slides; and at least one control device in communication with a Laboratory Information Management System (LIMS), wherein the at least one control device is configured to: query the LIMS with a sample identifier associated with a tissue sample block and receive tissue sample data from the LIMS; generate tissue processing workflow parameters based on the tissue sample data received from the LIMS for each tissue processing component to perform an automated tissue processing workflow; automatically control each tissue processing component according to the tissue processing workflow parameters to process the tissue sample block; generate at least one block processing update message while the tissue sample block is processed; and communicating the at least one block processing update message to the LIMS so as to enable the LIMS to track the automated tissue processing workflow associated with the tissue sample block.

In some aspects, the techniques described herein relate to a system, wherein the tissue processing workflow parameters include at least one sensitivity parameter defining a sensitivity of the tissue sample block; and wherein the at least one sensitivity parameter is configured to cause the at least one control device to control the one or more tissue processing components to handle the tissue sample block according to the sensitivity of the tissue sample block.

In some aspects, the techniques described herein relate to a system, further including at least one sensor device configured to measure operation of the one or more tissue processing components during processing of the tissue sample block throughout the automated tissue processing workflow, wherein the at least one control device is further configured to: receive sensor data representing the operation of the one or more tissue processing components from the at least one sensor device; determine a processing status of the tissue sample block based at least in part on the tissue processing workflow parameters and the sensor data; and generate the at least one block processing update message including the processing status.

In some aspects, the techniques described herein relate to a system, wherein the at least one control device is at least one of: i) at least one integrated control device integrated into a tissue processing device including the one or more tissue processing components, ii) at least one workstation control device of a workstation connected to the tissue processing device, or iii) a plurality of control devices having a combination of the at least one integrated control device and the at least one workstation control device.

In some aspects, the techniques described herein relate to a system including: one or more tissue processing components configured to produce one or more tissue sections from a tissue block and to transfer the one or more tissue sections from the tissue block to one or more slides; and at least one control device connected to a network, wherein the at least one control device is configured to: log tissue processing component operational data in an operational data log, wherein the tissue processing component operational data represents indicators of an operational state of the one or more tissue processing components; generate workflow progress data for at least one block processing workflow defining control of the one or more tissue processing components for processing at least one block of at least one tissue sample based at least in part on the tissue processing component operational data; determine tissue processing component performance based at least in part on the tissue processing component operational data; determine a tissue processing component operational state based at least in part on at least one of: the tissue processing component operational data, the workflow progress data, or the tissue processing component performance; determine tissue processing component predictive maintenance data indicative of at least one tissue processing component predictive maintenance need based on the tissue processing component operational state; and communicate a device report to a remote computing system so as to enable the remote computing system to optimize performance of the at least one of the tissue processing components; wherein the device report includes at least one of: the tissue processing component operational data, the workflow progress data, the tissue processing component performance, the tissue processing component operational state, or the tissue processing component predictive maintenance data.

In some aspects, the techniques described herein relate to a system, wherein the tissue processing component operational data includes error data indicative of one or more errors in operation of the tissue processing components; and wherein the at least one control device is further configured to initiate an automated debugging process based on the one or more errors.

In some aspects, the techniques described herein relate to a system, wherein the at least one control device is further configured to: identify a normal operation state indicative of normal operation of the tissue processing components of the one or more tissue processing components; and determine at least one optimization parameter configured to optimize the tissue processing components based at least in part on the normal operation state and at least one of: the tissue processing component operational data, or the tissue processing component performance.

In some aspects, the techniques described herein relate to a method including: querying, by at least one control device associated with a tissue processing system, a Laboratory Information Management System (LIMS) with a sample identifier associated with a tissue sample block and receive tissue sample data from the LIMS; wherein the tissue processing system is configured to: use a one or more tissue processing components to produce one or more tissue sections from a tissue block and to transfer the one or more tissue sections from the tissue block to one or more slides; generating, by the at least one control device, tissue processing workflow parameters based on the tissue sample data received from the LIMS; wherein the tissue processing workflow parameters define an operational configuration for the one or more tissue processing components to perform an automated tissue processing workflow; automatically controlling, by the at least one control device, the one or more tissue processing components according to the tissue processing workflow parameters to process the tissue sample block; generating, by the at least one control device, at least one block processing update message while the tissue sample block is processed, wherein the at least one block processing update message includes at least one of: at least one block processing status update, at least one report, at least one tissue image or at least one confirmation; and communicating, by the at least one control device, the at least one block processing update message to the LIMS so as to enable the LIMS to track the automated tissue processing workflow associated with the tissue sample block.

In some aspects, the techniques described herein relate to a method, wherein the tissue processing workflow parameters include at least one sensitivity parameter defining a sensitivity of the tissue sample block; and wherein the at least one sensitivity parameter is configured to cause the at least one control device to control the one or more tissue processing components to handle the tissue sample block according to the sensitivity of the tissue sample block.

In some aspects, the techniques described herein relate to a method, further including: receiving, by the at least one control device from at least one sensor device associated with the one or more tissue processing components configured to measure operation of the one or more tissue processing components during processing of the tissue sample block throughout the automated tissue processing workflow, sensor data representing the operation of the one or more tissue processing components from the at least one sensor device; determining, by the at least one control device, a processing status of the tissue sample block based at least in part on the tissue processing workflow parameters and the sensor data; and generating, by the at least one control device, the at least one block processing update message including the processing status.

In some aspects, the techniques described herein relate to a method, wherein the at least one control device is at least one of: i) at least one integrated control device integrated into a tissue processing device including the one or more tissue processing components, ii) at least one workstation control device of a workstation connected to the tissue processing device, or iii) a plurality of control devices having a combination of the at least one integrated control device and the at least one workstation control device.

In some aspects, the techniques described herein relate to a method including: logging, by at least one control device associated with a tissue processing system including a one or more tissue processing components to produce one or more tissue sections from a tissue block and to transfer the one or more tissue sections from the tissue block to one or more slides, tissue processing component operational data and an operational data log, wherein the tissue processing component operational data represents indicators of an operational state of a one or more tissue processing components of a one or more tissue processing components associated with the at least one control device; wherein the at least one control device is connected to a network; generating, by the at least one control device, workflow progress data for at least one block processing workflow defining control of the one or more tissue processing components of the one or more tissue processing components for processing at least one block of at least one tissue sample based at least in part on the tissue processing component operational data; determining, by the at least one control device, a tissue processing component performance based at least in part on the tissue processing component operational data; determining, by the at least one control device, a tissue processing operational state based at least in part on at least one of: the tissue processing component operational data, the workflow progress data, or the tissue processing component performance; determining, by the at least one control device, predictive maintenance data indicative of at least one tissue processing component predictive maintenance need based on the tissue processing operational state; and communicating, by the at least one control device, a device report to a remote computing system so as to enable the remote computing system to optimize performance of one or more of the tissue processing components; wherein the device report includes at least one of: the tissue processing component operational data, the workflow progress data, the tissue processing component performance, the tissue processing operational state, or the tissue processing component predictive maintenance data.

In some aspects, the techniques described herein relate to a method, further including initiating, by the at least one control device, an automated debugging process based on one or more errors, wherein the tissue processing component operational data includes error data indicative of the one or more errors in operation of the one or more tissue processing components In some aspects, the techniques described herein relate to a method, further including: identifying, by the at least one control device, a normal operation state indicative of normal operation of the one or more tissue processing components of the one or more tissue processing components; and determining, by the at least one control device, at least one optimization parameter configured to optimize the one or more tissue processing components based at least in part on the normal operation state and at least one of: the tissue processing component operational data, or the tissue processing component performance.

In some aspects, the techniques described herein relate to a non-transitory computer readable medium including software instructions configured to cause at least one control device to perform steps for automated control of one or more tissue processing components, the steps including: querying a Laboratory Information Management System (LIMS) with a sample identifier associated with a tissue sample block and receive tissue sample data from the LIMS; wherein the one or more tissue processing components is configured to produce one or more tissue sections from a tissue block, and to transfer the one or more tissue sections from the tissue block to one or more slides; generating tissue processing workflow parameters based on the tissue sample data received from the LIMS; wherein the tissue processing workflow parameters define an operational configuration for the one or more tissue processing components to perform an automated tissue processing workflow; automatically controlling the one or more tissue processing components according to the tissue processing workflow parameters to process the tissue sample block; generating at least one block processing update message while the tissue sample block is processed, wherein the at least one block processing update message includes at least one of: at least one block processing status update, at least one report, at least one tissue image or at least one confirmation; and communicating the at least one block processing update message to the LIMS so as to enable the LIMS to track the automated tissue processing workflow associated with the tissue sample block.

In some aspects, the techniques described herein relate to a non-transitory computer readable medium, wherein the tissue processing workflow parameters include at least one sensitivity parameter defining a sensitivity of the tissue sample block; and wherein the at least one sensitivity parameter is configured to cause the at least one control device to control the one or more tissue processing components to handle the tissue sample block according to the sensitivity of the tissue sample block.

In some aspects, the techniques described herein relate to a non-transitory computer readable medium, wherein the steps further include: receiving, from at least one sensor device associated with the one or more tissue processing components configured to measure operation of the one or more tissue processing components during processing of the tissue sample block throughout the automated tissue processing workflow, sensor data representing the operation of the one or more tissue processing components from the at least one sensor device; determining a processing status of the tissue sample block based at least in part on the tissue processing workflow parameters and the sensor data; and generating the at least one block processing update message including the processing status.

In some aspects, the techniques described herein relate to a non-transitory computer readable medium including software instructions configured to cause at least one control device to perform steps for automated control of a tissue processing system, the steps including: logging tissue processing component operational data and an operational data log, wherein the tissue processing component operational data represents indicators of an operational state of a one or more tissue processing components of a one or more tissue processing components associated with the at least one control device; wherein the tissue processing system is configured to produce one or more tissue sections from a tissue block, and to transfer the one or more tissue sections from the tissue block to one or more slides; generating workflow progress data for at least one block processing workflow defining control of the one or more tissue processing components of the one or more tissue processing components for processing at least one block of at least one tissue sample based at least in part on the tissue processing component operational data; determining tissue processing component performance based at least in part on the tissue processing component operational data; determine a tissue processing operational state based at least in part on at least one of: the tissue processing component operational data, the workflow progress data, or the tissue processing component performance; determining tissue processing component predictive maintenance data indicative of at least one tissue processing component predictive maintenance need based on the tissue processing operational state; and communicating a device report via a network to a remote computing system so as to enable the remote computing system to optimize performance of one or more of the tissue processing; wherein the device report includes at least one of: the tissue processing component operational data, the workflow progress data, the tissue processing component performance, the tissue processing operational state, or the tissue processing component predictive maintenance data.

In some aspects, the techniques described herein relate to a non-transitory computer readable medium, wherein the tissue processing component operational data includes error data indicative of one or more errors in operation of the one or more tissue processing components; and wherein the at least one control device is further configured to initiate an automated debugging process based on the one or more errors.

In some aspects, the techniques described herein relate to a non-transitory computer readable medium, wherein the steps further include: identifying a normal operation state indicative of normal operation of the one or more tissue processing components of the one or more tissue processing components; and determining at least one optimization parameter configured to optimize the one or more tissue processing components based at least in part on the normal operation state and at least one of: the tissue processing component operational data, or the tissue processing component performance component performance.

In some embodiments, the present disclosure provides automated control of tissue processing components, including components for tissue block on-boarding, tissue block sectioning, and slide preparation in response to the receipt of processing protocol data from the LIMS. In some embodiments, the processing system queries processing protocol information from the LIMS automatically in response to the tissue sample block being provided in a sample drawer via direct or networked connections between the processing system and the LIMS. The processing protocol information is received from the LIMS and used to generate instructions to automatically control a tissue processing system for automated tissue section preparation in an end-to-end fashion. Accordingly, the automatic control of the tissue processing system processing system removes the need for error-prone and lengthy manual entry of processing protocol information.

In some embodiments, the systems and methods of the present disclosure enable the tissue processing system to notify the LIMS once the tissue processing system processing system prepares the slides with the tissue sections. In some embodiments, the tissue processing system can provide information to the LIMS about the number and location of the slides within the machine workflow. The tissue processing system can send preliminary tissue images and sectioning report to LIMS in any suitable format (e.g., TIFF, PNG, PDF, JPEG, Excel, Word, Open Document, XML, or other format).

In some embodiments, the present disclosure provides systems and methods for interfacing the tissue processing system with remote device management servers to communicate consumable, predictive maintenance, and usage statistics to increase device performance and reduce downtime.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

Figure 1A:
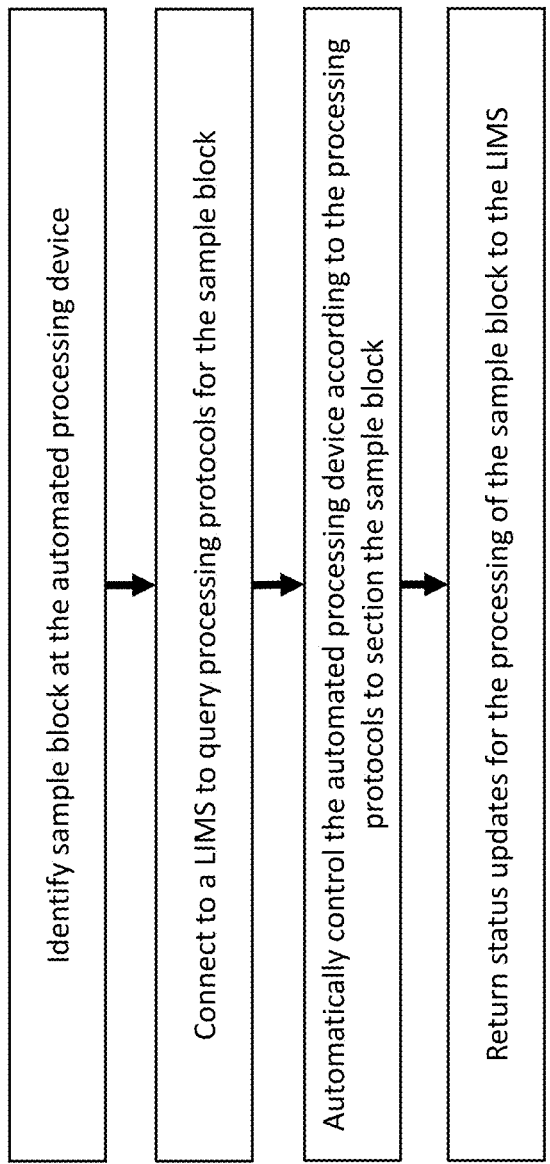
FIG. 1A is a flow chart illustrating aspects of at least one embodiment of the automated steps of a tissue processing system implementing direct or networked communication with a laboratory information management system to automatically carry out tissue sample sectioning upon provision of a tissue sample block in accordance with aspects of embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Systems and methods of the present invention enable a fully automated tissue processing system connected to a Lab Information Management System (LIMS) to obtain processing protocol for a given sample on board the tissue processing system. The systems and methods include setting the block processing parameters on the automated tissue processing system programmatically according to the information in the processing protocol combined with real time cameras and other sensory information and communicate the status of the slides created during and after tissue block is processed, or any errors, back to the LIMS. In addition, the fully automated tissue processing system may be connected to remote device management servers to communicate consumable, predictive maintenance, and usage statistics to increase device performance and reduce downtime.

In some respects, the present disclosure provides a tissue processing system that is configured to connect to a LIMS database to query information for processing of tissue samples from a sample block. The tissue processing system can be further configured to notify the LIMS once the tissue sample are processed and provide information to the LIMS about the prepared samples. The present disclosure generally relates to connected and automated systems configured for tissue section preparation. In some embodiments, the tissue processing system can further interface with device management servers to communicate consumable, predictive maintenance, and usage statistics to increase device performance and reduce downtime. In some embodiments, tissue processing and/or tissue preparation may refer to preparation and processing of tissue sections, which may include tissue block facing and sectioning to generate tissue sections, and transferring the tissue sections to slides, and associated processes to prepare slides with tissue sections.

Unlike techniques where a technician manually inputs processing parameters for processing the tissue samples, or where the technician and/or computing system input a workflow identifier, embodiments of the present disclosure enable the tissue processing system to acquire sample-related information for each tissue sample to automatically generate the workflow parameters. Thus, the tissue processing system of the present disclosure enable automated decisioning and workflow generation, tracking and optimization by the tissue processing system itself. The processing of the tissue sample may then be locally controlled and tracked such that the tissue processing system can provide tissue processing updates to the LIMS database. Accordingly, the need for manual processes and/or additional processing systems is reduced.

Referring to FIG. 1A, sample sectioning can be performed automatically using a tissue processing system that is connected to a LIMS and/or a device management server, among other remote computing systems (e.g., user computing device such as a laptop computer, desktop computer, mobile computing device, etc.). The LIMS may have sample block data for each sample block. Thus, the tissue processing system may identify the sample block and connect to the LIMS to query processing protocols for the sample block, such as processing protocols, handling protocols, tracking protocols, operation and section ordering, among other protocols for any portions of the processing of a tissue block by the tissue processing system. Upon receiving the processing protocols from the LIMS, the tissue processing system may be automatically controlled according to the processing protocols to prepare tissue sections from the sample block. During sectioning or after sectioning is completed and the tissue sections are placed on the slides, the tissue processing system may connect to the LIMS to provide updates on the status of the tissue sections, such as, for example, a current progress towards completed processing and sectioning of the sample block according to the processing protocols, a processing report (for example, as a portable document format (PDF) or other suitable document format) and preliminary tissue on slide images. The LIMS may store the processing reports for the sample block. Additionally, the tissue processing system may connect to a device management server or system to upload operational, maintenance, consumable and usage data to track the operations of the tissue processing system.

Figure 1B:
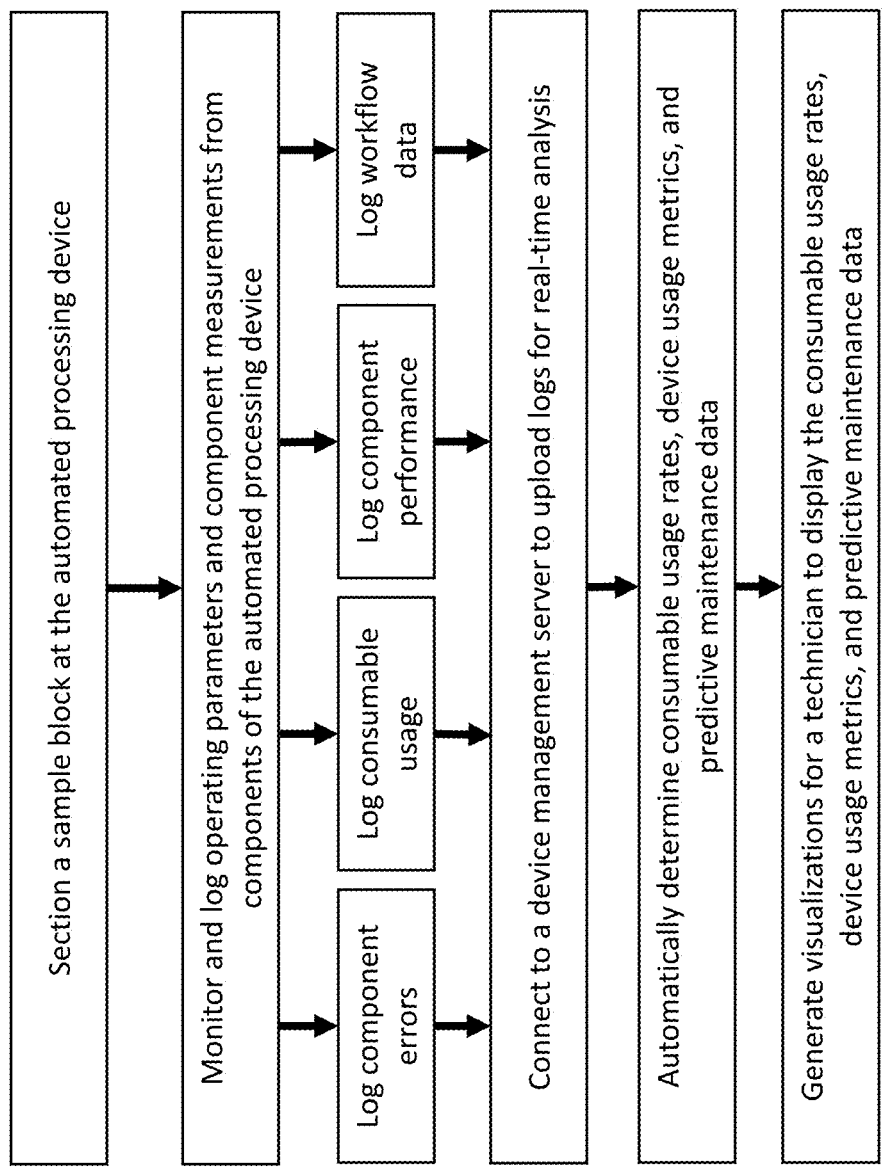
FIG. 1B is a flow chart illustrating aspects of at least one embodiment of the automated steps of a tissue processing system implementing direct or networked communication with a device management server to automatically monitor, log, aggregate and analyze device usage, consumable usage, performance, maintenance and other device metrics in accordance with aspects of embodiments of the present disclosure.

Referring to FIG. 1B, the tissue processing system may be provided with a control system to monitor and log component measurements from components of the tissue processing system, the measurements being indicative of usage of each component, performance of each component, functionality or malfunctions or errors of each component, use of materials such as slides, sprays, adhesives, cutting blades, etc., among other measurements regarding operational status and/or performance of components of the tissue processing system directly from component feedback or inferred from component feedback.

FIGS. 1A through 12 illustrate systems and methods of interfacing tissue processing systems with LIMS and device management servers for connected tissue processing systems with automated processing protocol generation. The following embodiments provide technical solutions and technical improvements that overcome technical problems, drawbacks and/or deficiencies in the technical fields involving interfacing between tissue processing systems and devices and LIMS, device management servers, or both. As explained in more detail, below, technical solutions and technical improvements herein include aspects of improved controls systems and middleware for providing an interface between tissue processing systems and one or more remote LIMS, one or more local LIMS, or a combination thereof, to enable automated processing protocol data queries and processing protocol generation and implementation. Based on such technical features, further technical benefits become available to users and operators of these systems and methods. Moreover, various practical applications of the disclosed technology are also described, which provide further practical benefits to users and operators that are also new and useful improvements in the art.

In some embodiments, the present disclosure is directed to leveraging data stored in a LIMS for patients and an associated tissue sample by automatically retrieving from the LIMS processing protocols to apply to the section of a tissue sample block. The present disclosure overcomes the problems and deficiencies of the prior art by reading an identifier identifying the tissue sample block and automatically querying the LIMS connected to the tissue processing system. The query returns from the LIMS processing protocol data that automatically adjusts parameters of the automated processing system, such as duration hydration, number of sections to be cut, section thickness, etc. to cause the automated section system to process and section the tissue sample block according to the processing protocol data. Upon processing the tissue sample block, processing status updates may be provided to the LIMS in additional queries or other communications to the LIMS to update a processing status of the tissue sample block.

In some embodiments, the present disclosure further includes leveraging networking or otherwise interfacing with a device management server include one or more remote servers, one or more local servers, or any combination thereof for real-time monitoring of device status, device usage, consumable usage, maintenance requirements including predictive maintenance, among other device management functions. The processing status may periodically or continuously update the device management server with, e.g., component operating conditions, component usage, tissue processing system usage, consumable levels, operating state and other metrics. Upon receiving the metrics, the device management server may automatically analyze device operation and device usage to determine usage metrics, consumable needs, predictive maintenance, among other device management analyses to alert technicians and administrators to prevent downtime and risk of errors and malfunctions, as well as to determine device improvements and business improvements based on usage.

Embodiments of a System for Automated Tissue Section Processing

Figure 2:
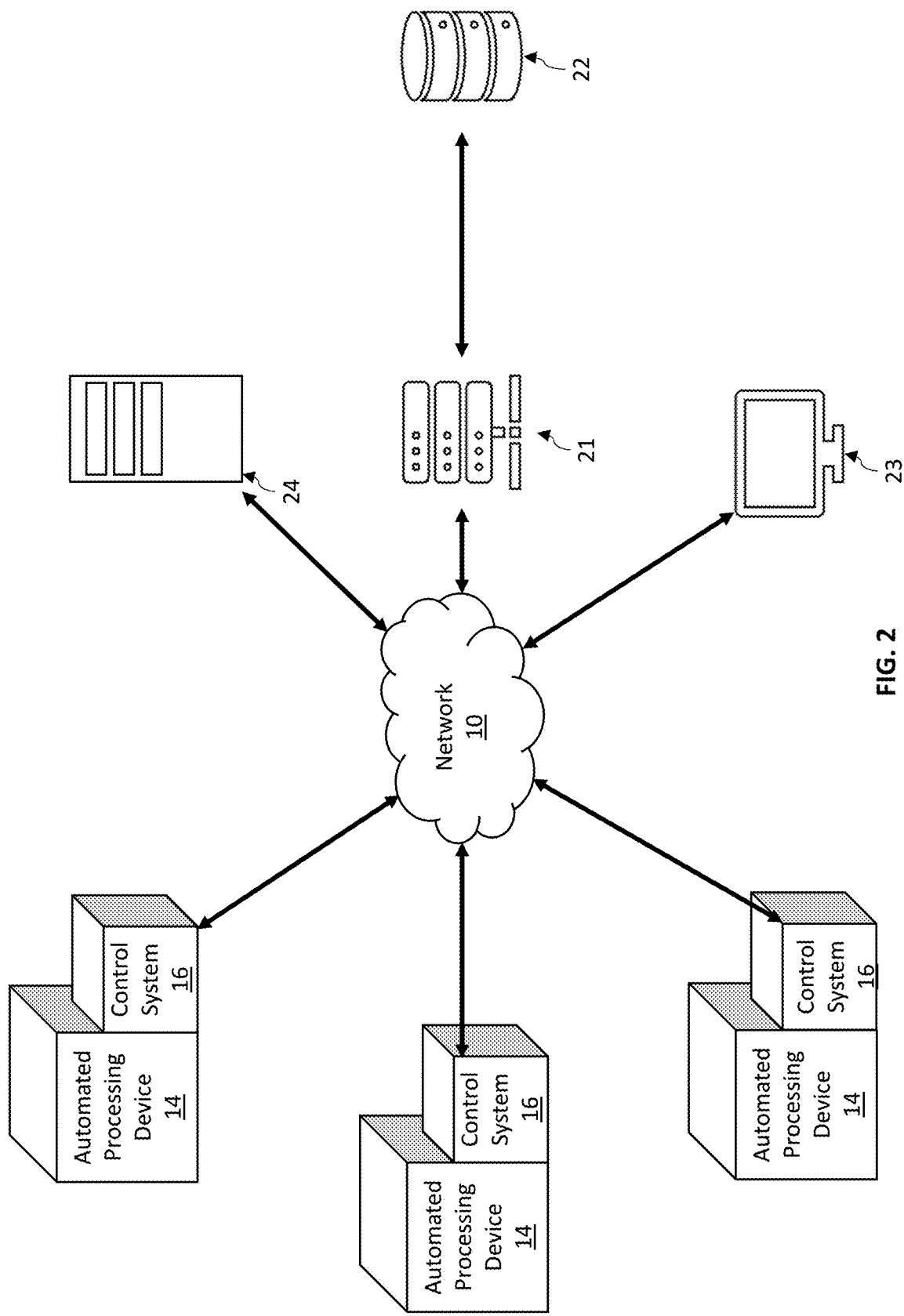
FIG. 2 is a diagram of a LIMS-connected tissue processing system of the present disclosure having a control system in communication with at least one device management server for automatically management the automated tissue processing system, and to a LIMS for automatically providing and implementing processing protocols for sample blocks in accordance with aspects of embodiments of the present disclosure.

FIG. 2 is a block diagram of aspects of a network of tissue processing systems in accordance with one or more embodiments of the present disclosure.

In some embodiments, multiple tissue processing systems 14 may be connected to a LIMS 22 and a device management server 24 via a network 10, such as, e.g., a laboratory or hospital network. In some embodiments, the connection to the network 10 may be leveraged to automatically retrieve tissue processing protocols for implementation by the control systems 16 to automatically process tissue samples at each tissue processing system 14 to automatically prepare each tissue sample. Moreover, the network 10 may facilitate the collection and aggregation of tissue processing system 14 data at the device management server 24 for more efficient and data rich analysis of usage patterns, performance patterns and maintenance.

In some embodiments, at least some devices on the network 10 may be positioned local to each other, such as in a common laboratory, building, healthcare facility, business facility, etc. Thus, each tissue processing system 14, the LIMS 22 and the device management server 24 may be locally positioned relative to each other. In some embodiments, at least some devices on the network 10 may be positioned remotely from each other, such as in across different laboratories, different buildings, different healthcare facilities, different business facilities, one or more data centers, one or more cloud networks, etc. Thus, each tissue processing system 14, the LIMS 22 and the device management server 24 may be remotely positioned relative to each other. In some embodiments, the tissue processing systems 14, the LIMS 22 and the device management server 24 may be connected via the network 10 with any suitable combination of local and remote positioning relative to each other.

In some embodiments, a sample block can be automatically processed according to a processing protocol using any one of the tissue processing systems 14. Ordinarily, the processing protocol would be entered into the tissue processing system 14 by a histotechnician using patient and tissue information in the LIMS 22. However, the entry of processing protocols into a tissue processing system 14 is a long and error prone process that serves to bottleneck the efficiency of the preparation of tissue sections, and ultimately in the testing of the sectioned sample block. The histotechnician would be required to enter many processing protocol parameters for many sample blocks and/or tissue sections, which slows down the testing process and increases the risk of errors. Accordingly, in some embodiments, the tissue processing system 14 is equipped with a control system 16 that is configured to communicate with a LIMS 22, e.g., via middleware 21. In some embodiments, tracking and processing of tissue samples can be achieved by a number of integrated sub-assemblies and mechanisms (hereinafter "components"), including, by way of a non-limiting example, one or more barcode readers to read and extract the barcode data of glass slides on which sectioned tissue samples are provided, one or more microtomes, block handlers, hydration chambers, racks, shifting assemblies and other components. The control system 16 may produce instructions for the automated control the various components according to tissue processing protocols and to monitor the usage and performance of each component. For example, the control system 16 may control the barcode reader to automatically extract barcode data, which may be used to query processing protocol data from the LIMS and to update processing status information for the tissue sample block in the LIMS by uploading a section ID in the barcode data associated with the section on the corresponding glass slide, including, e.g., identifying the thickness, the tissue sample block, and other information such as a section count, etc.

Accordingly, in some embodiments, the control system 16 may include at least one software component, at least one hardware component and/or a combination of at least one software component and at least one hardware component which are designed/programmed/configured to manage/control other software and/or hardware components (such as the libraries, software development kits (SDKs), objects, etc.). The at least one software component and/or hardware component are configured for querying the processing protocol data, generating instructions to the various components based on the processing protocol data to perform automated processing of a sample block, and to monitor the status of sectioning tasks as well as the performance and usage of the components.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, ARM, Intel or other processors, multi-core, or any other microprocessor or central processing unit (CPU) or Graphical Processing Unit (GPU). In various implementations, the one or more processors may be dual-core processor(s), dual-core mobile processor(s), and so forth.

In some embodiments, the processing device may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory.

In some embodiments, a control system 16 of each tissue processing system 14 may be connected to a network 10 for communication with the LIMS 22 and the device management server 24. In some embodiments, the LIMS 22 may include software that uses a suitable communication standard for laboratory data communication, such as, e.g., HL7, FHIR or others or any combination thereof. Accordingly, the LIMS 22 may be compatible with general communication standards for hospital operations for improved compatibility and efficiency of communication between ordering entities, such as doctors and nurses, and the people or machines executing the orders. The communication standards also streamline communication on the reverse direction to disseminate and document information from the machines to the consumers of information. In some embodiments, the tissue processing system 14 may utilize LIMS 22 software to access or otherwise retrieve orders on the samples loaded on the system. In some embodiments, once the tissue processing system 14 executes the orders, the tissue processing system 14 may utilize the communication standards to communicate confirmation of actions or a status update or both back to the LIMS 22. In some embodiments, the information may include confirmation of the barcodes IDs used, images taken during the processing of the tissue, any preliminary tissue images that can facilitate diagnosis or re-orders for different operations, various processing reports in machine readable format (HL7, FHIR, Extensible Mark-Up Language (XML), JSON, etc.) and human readable (Comma-Separated Values (CSV) file, PDF, Excel, Word, Open Document, Open XML Paper Specification (OpenXPS), etc.).

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the LIMS 22 may include, e.g., a database or other data storage solution, for maintaining laboratory data, patient data, tissue sample data, and processing protocol data associated with patients and/or sample blocks, among other laboratory-related data.

In some embodiments, a database of the LIMS 22 may include an organized collection of data, stored, accessed or both electronically from a computer system such as the control system 16 of the tissue processing system 14 to retrieve the processing protocol data. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof. As a result, the control system 16 may automatically query the LIMS 22 using any suitable query language according to the database model, database technology, and/or storage technology in response to the provision of a tissue sample block to the tissue processing system 14.

For example, in some embodiments, the control system 16 may use a database query language to retrieve the processing protocol data from the database of the LIMS 22 depending on the database model. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, or any other suitable database query languages.

The database may include one or more software, one or more hardware, or a combination of one or more software and one or more hardware components forming a database management system (DBMS) that interacts with users, applications, and the database itself to capture and analyze the processing protocol data. The DBMS software additionally encompasses the core facilities provided to administer the database. The combination of the database, the DBMS and the associated applications may be referred to as a "database system".

In some embodiments, a server of the LIMS 22 may include a service point which provides processing, database, and communication facilities to connected devices such as, e.g., the control system 16 of the tissue processing system 14. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples. In some embodiments there could be multiple servers and clients on the network. The role of client and server can change depending on the tasks communicated on the network, such as for the access and retrieval of the processing protocol data from the LIMS 22 by the control system 16 of the tissue processing system 14.

In some embodiments, the LIMS 22 may alternatively or additionally include a cloud system, e.g., as a Software-as-a-Service, Function-as-a-Service, data storage or other cloud implementation for managing and providing the laboratory, patient and sample testing data and/or one or more servers. In some embodiments, the cloud implementation may utilize: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, the control system 16 automatically communicates with the LIMS 22 to retrieve processing protocol data using middleware 21. In some embodiments, the middleware 21 may include software that lies between an operating system and the applications running on it to function as hidden translation layer. In some embodiments, the middleware 21 enables communication and data management for local, cloud and distributed applications, including communication between the control system 16 and the LIMS 22.

In some embodiments, middleware examples may include database middleware compatible with the data communications standard of the LIMS 22 and with the control system 16 of the tissue processing system 14. Each program may provide messaging services so that different applications can communicate using messaging frameworks like simple object access protocol (SOAP), web services, representational state transfer (REST), and JavaScript object notation (JSON). In some embodiments, the middleware 21 can include functionality for security authentication, transaction management, message queues, applications servers, web servers, and directories. In some embodiments, the middleware 21 can include distributed processing with actions occurring in real time rather than sending data back and forth.

In some embodiments, the middleware 21 may manage the connection between the LIMS 22 and one or more laboratory devices, including, e.g., the tissue processing systems 14 and/or any other tissue tissue processing components. In some embodiments, the middleware 21 may be software installed locally to a control system of each laboratory device, including the control system 16. In some embodiments, the middleware 21 may include software on the control system 16, on the LIMS 22, or both. Alternatively, or in addition, the middleware 21 may include a separate computing device, such as, e.g., a laptop computer, desktop computer, mobile computing device (e.g., smartphone, tablet, wearable, etc.), server, mainframe, or any other suitable computing device for implementing a messaging protocol to transfer data between the control system 16 (among any other control systems of other laboratory devices) and the LIMS 22.

In some embodiments, each of the control system 16, the middleware 21 and the LIMS 22 may communicate via direct or networked communication techniques, such as via the network 10. For example, each of the control system 16, the middleware 21 and the LIMS 22 may communicate via a direct wired or wireless connection. In some embodiments, the network 10 may include any suitable computer network, including, two or more computers that are connected with one another for the purpose of communicating data electronically. In some embodiments, the network may include a suitable network type, such as, e.g., a local-area network (LAN), a wide-area network (WAN) or other suitable type or any combination thereof. Accordingly, in some embodiments, the network 10 may include one or more of local area, wide area, open or closed networks or network of networks (e.g., the Internet) or any combination thereof.

In some embodiments, whether the middleware 21 interface the control system 16 with LIMS 22 via a local connection or the network 10, the middleware 21 may utilize any suitable communication protocol or other data communication technique such as, without limitation, HL7, IPX/SPX, X.25, AX.25, AppleTalk™, TCP/IP (HTTP/HTTPS/peer to peer), MLLP (Minimum Lower Level Protocol), Bluetooth™, near-field wireless communication (NFC), RFID, Narrow Band Internet of Things (NBIOT), 3G, 4G, 5G, GSM, GPRS, WiFi, WiMax, CDMA, OFDM, OFDMA, LTE, satellite, ZigBee, and other suitable communication modes. Various embodiments herein may include interactive posters that involve wireless, e.g., Bluetooth™ and/or NFC, communication aspects, as set forth in more detail further below.

In some embodiments, to acquire the processing protocol data, the control system 16 may provide the sample data from the barcode ID of a tissue sample block to the LIMS 22 via the middleware 21. In some embodiments, the sample data may include a sample ID identifying the tissue sample block provided to the tissue processing system 14. In some embodiments, the sample ID (e.g., the accession ID) of the sample block may identify the sample block in the LIMS 22. While the sample data may also include a patient ID of an associated patient, a patient may have multiple sample blocks with different processing protocols associated therewith. Therefore, in some embodiments, the control system 16 may use the sample ID alone or along with the patient ID to query the LIMS 22. In some embodiments, each sample block has a unique sample ID or accession ID that associates the sample block with the patient as well as the particular processing protocol for the particular sample block, and thus using the sample ID may more accurately return the appropriate processing protocol data.

Accordingly, the control system 16 may identify the sample ID, e.g., based on barcode data read from a barcode on the sample block, and instruct the middleware 21 to retrieve sample processing protocol data assigned to the sample block from the LIMS 22. In some embodiments, the LIMS 22 may have stored in the database pre-defined processing protocol data for the sample block, or the LIMS 22 may have other sample data that is used by LIMS software to automatically determine the processing protocol data based on, e.g., a tissue, a tissue type, one or more tests, one or more testing types, among other data related to requirements and/or uses of sections of a sample block. In some embodiments, middleware 21 may retrieve from the LIMS 22 the pre-defined processing protocol data, the automatically determined processing protocol data, or any combination thereof. These protocols may include the number of sections to be cut, the thickness of sections, or how long the sections need to be hydrated.

In some embodiments, the middleware 21 (or the system itself, when no middleware) may be configured to retrieve the processing protocol data from the LIMS 22 using, e.g., an API request or database query. For example, the middleware 21 may be configured to utilize the sample ID from the control system 16 to formulate a database query using a suitable query language, such as, e.g., SQL, Cypher, JSONiq, SPARQL, OQL, REST, SOAP, or any other suitable query language or protocol. In some embodiments, in addition or in the alternative, the middleware 21 may search the LIMS 22 using, e.g., a search technique such as heuristic search, basic or brute force search, tree search, or any other suitable search technique. In some embodiments, in addition or in the alternative, the middleware 21 may retrieve the sample testing data from the LIMS 22 using, e.g., an API request according to an API associated with the LIMS 22 such as RESTful, SOAP or any other LIMS APIs.

In some embodiments, multiple sample blocks may be provided to the tissue processing system 14 for serial or parallel processing. Alternatively, or in addition, multiple tissue processing systems 14 may be connected to the LIMS 22. Thus, in some embodiments, the control system 16 of the tissue processing system 14 and/or control systems 16 of each tissue processing system 14 may communicate multiple queries via the middleware 21 (or the system itself, if no middleware) to the LIMS 22 to query processing protocol data. In some embodiments, the multiple queries may be sent to the middleware 21 and/or the LIMS 22 in a continuous stream or in period batches. In some embodiments, the batches may be sent based on a predetermined temporal period (e.g., every minute, every five minutes, every ten minutes, every fifteen minutes, every half hour, every hour, etc.) or for a predetermined number of sample IDs (e.g., a batch for every two, three, five, seven, ten, fifteen, twenty, twenty five, fifty, one hundred or other number of sample IDs) for which processing protocol data is sought. Accordingly, in some embodiments, the LIMS 22 may return processing protocol data for each sample ID of the multiple sample IDs to be downloaded by the control system(s) 16 in a stream or in batches similar to the batches of the queries.

In some embodiments, in response to each query, the LIMS 22 may return sample processing data based on the sample ID. In some embodiments, the LIMS 22 may return all sample block-related data associated with the sample block of the sample ID and the middleware 21 may identify the sample processing data, including processing protocols and processing parameters for the sample block. In some embodiments, the query or other request to the LIMS 22 may cause the LIMS 22 to return only the sample processing data including the processing protocols and processing parameters assigned to the sample block.

In some embodiments, rather than a query-response arrangement, the control system 16 and the LIMS 22 may employ a publish-subscribe model. The LIMS 22 may publish processing protocol data for each sample ID, and the control system 16 may subscribe to a particular sample ID to receive the published processing protocol data. Any other suitable messaging pattern, such as, e.g., message queue, server and/or API push, client and/or API pull, Real Simple Syndication (RSS), observer pattern, message broker, among others or any combination thereof.

In some embodiments, the control system 16 may include computer engines for interfacing with the LIMS 22 to acquire the processing protocols, and computer engines for automated control of the tissue processing system 14. In some embodiments, one or more of the computer engines may be implemented by a control device integrated into the tissue processing system 14, separate from the tissue processing system 14 (e.g., as a workstation connected to the tissue processing system 14), or any suitable combination thereof. In some embodiments, for example, a workstation may include a control device in communication with the tissue processing system 14 and the network 10. Thus, the workstation may interface with the LIMS 22 over the network 10 to pull, receive a push, subscribe, query or otherwise acquire the processing protocols.

The workstation may acquire the processing protocols on a periodic basis, such as, e.g., every fifteen minutes, every thirty minutes, every forty-five minutes, every hour, every two hours, every three hours, every four hours, every five hours, every six hours, every seven hours, every eight hours, every nine hours, every ten hours, every eleven hours, every twelve hours, every day, or any other suitable period. Alternatively, or in addition, the workstation may continuously monitor for processing protocols, e.g., by using the publish-subscribe, observer, message queue or other pattern. While the control device for interfacing with the LIMS 22 may be integrated into the tissue processing system 14, integrating the control device into a separate but connect workstation enables additional processing resources to participate in the messaging, thus enabling more efficient use of the processing resources of the tissue processing system 14.

In some embodiments, the processing protocol data may include, e.g., a number of tissue sections and a thickness of each tissue section of the sample block, a hydration time for each tissue section, a tissue or tissue block sensitivity, quality control information, as well as other processing-related parameters. In some embodiments, tissue block sensitivity may defined by a type of the tissue, a size of the tissue block, a number of pieces of tissue in the tissue block, among other characteristics of the tissue block. In some embodiments, sensitivity may be effect tissue processing parameters, including handling parameters (e.g., speed and/or force of the block handler 102, slide singulator 118 and/or microtome 104 among others or any combination thereof), speed and/or force of section cutting parameters by the microtome 104, among other processing parameters or any combination thereof. In some embodiments, the processing parameters may be optimized based on tissue sensitivity according to, e.g., user configuration, feedback from sensor-based monitoring, predefined configurations or any other suitable configuration to ensure processing parameters do not degrade the physical and/or chemical integrity of the tissue block.

In some embodiments, the middleware 21 may receive the processing protocol data and pass the processing protocol data to the control system 16. In some embodiments, upon receipt of the processing protocol data, the control system 16 may automatically determine processing parameters for the tissue sample block. The processing parameters define operational parameters of each component of the tissue processing system 14 such that, the tissue processing system 14 may execute instructions corresponding to the sectioning parameters to automatically sections a set of tissue sections from the tissue sample block and mounts the sections of slides for later use. In some embodiments, the automatic querying of the LIMS 22 and determination of processing parameters from the processing protocol data facilitate a fully automated end-to-end tissue processing by tissue processing system 14 in response to the provision of the tissue sample block.

In some embodiments, the control system 16 may also communicate with an administrative system 23 such as, e.g., a laboratory workstation or other suitable administrative system 23. In some embodiments, the administrative system 23 may include a local or remote terminal, such as, e.g., a display device and input device, a thin client, or other suitable terminal for interfacing with the control system 16. In some embodiments, the administrative system 23 may include, e.g., a cloud or server-based service in communication with the control system 16, e.g., via a suitable network.

In some embodiments, the administrative system 23 may communicate with the control system 16 to enable a user, such as an administrator or technician, to perform and/or view device diagnostics, sectioning status information, usage of consumable material, among other device-related and processing-related data. The user may interact the control system 16 via the administrative system 23 to, e.g., adjust device settings, reset components, debug issues, among other functions.

In some embodiments, upon completion of the processing of each section of the sample block or of the entire sample block or both, the control system 16 may generate a processing confirmation confirming the completed processing. In some embodiments, the processing confirmation may be returned to the LIMS 22 via the middleware 21 (or the system itself, if no middleware) to update a data record associated with the sample, such as the sample block-related data associated with the sample ID, to add the processing confirmation to the sample block-related data and/or the sample processing data. In some embodiments, similar to the query to retrieve to the processing protocol data, the control system 16 and/or the middleware 21 may formulate a suitable query including the processing confirmation and the sample ID and communicate the query to the LIMS 22. The query may instruct the LIMS 22 to add the processing confirmation to the sample block-related data for the sample ID.

In some embodiments, the control system 16 may track processing progress as well as device state data, usage data, among other data. Such data may be provided to a processing device management system 24 in communication with the control system 16. In some embodiments, the processing device management server 24 may include, e.g., one or more servers, cloud servers, databases, cloud platforms or other computing systems suitable for tracking usage, state, maintenance and other information related to each tissue processing system 14.

In some embodiments, the control system 16 may track a rate of use of consumables. For example, a microtome may use blades that dull or corrode over time, a transfer mechanism may employ slides onto which tissue sections are transferred, adhesives, coatings, sprays, and other materials may be employed in the processing of tissue samples for sectioning. In some embodiments, the control system 16 may monitor how often or how many times a give component is used, or how much of a given material has been used or how much remains. In some embodiments, the control system 16 may use this information to determine a consumable usage or consumable usage rate or both and log the information, the consumable usage or the consumable usage rate, or any combination thereof. These logs, may be, e.g., continuously or periodically upload the information, the consumable usage and/or the consumable usage rates to the processing device management server 24. In some embodiments, the processing device management server 24 track the rate of use of the consumables as well monitor real-time consumable supply at the tissue processing system 14. Based on the supply and the rate of use, the processing device management server 24 automatically generate a notification to a user, e.g., at the administrative system 23, to recommend ordering new materials.

Similarly, in some embodiments, the control system 16 may include motion sensors, component actuation detectors, image sensors (e.g., cameras), motor current measurements, among other sensors and component monitors. In some embodiments the sensor data and component monitor data may be uploaded to the processing device management server 24 for usage analysis, maintenance analysis and predictive maintenance recommendations. For example, in some embodiments, the image sensor may be calibrated for illumination power and wavelength in the tissue processing system 14 based on calibration targets. Based on the calibration, the processing device management server 24 may use the image sensor data to measure illumination and wavelength of light in the tissue processing system 14 to identify discrepancies indicative of operational failures, miscalibration or other faults and errors.

In some embodiments, the image sensor data may be used to track operation and accuracy of processing operations including the positioning and sectioning of sample blocks. For example, the image sensor may capture images along a visible axis of sample block, tissue section and/or component position information. The processing device management server 24 may automatically identify, e.g., using a suitable image recognition technique (e.g., machine learning model, image matching model, or other technique) to identify the objects in the images as the sample block, tissue section and/or component position information, and compare the position information thereof with commanded positions according to the processing protocols to identify discrepancies indicative of operational failures, miscalibration or other faults and errors. Similarly, motion sensors may provide motion data associated with components of the connected tissue processing system 14. The processing device management server 24 may compare the motion data with actuation commands to identify discrepancies indicative of operational failures, miscalibration or other faults and errors.

In some embodiments, the processing device management server 24 may use the motor current measurements, rate of system quality control check warnings, system quality control check warning types, and other data to further determine whether the tissue processing system 14 is operating within specifications (e.g., operating normally). For example, the processing device management server 24 may include operational values according to the specifications for the tissue processing system 14 to enable the control system 16 to alter operational values to optimize the tissue processing system 14 for better processing performance. Each of the motor current measurements, rate of system quality control check warnings, system quality control check warning types, and other data may be compared to the operational values to determine a state of the tissue processing system 14 and/or components thereof to identify states indicative of operational failures, miscalibration or other faults and errors.

In some embodiments, the operational values and/or the image sensor data may be used to optimize the operation of the components of the automated processing device 14 according to the tissue block being processed. For example, a tissue type may indicate harder or softer tissue than other tissue types, wetter or drier tissue than other tissue types, a level of transparency or reflectivity of the tissue type, among other characteristics of the tissue sample block that effect the imaging, handling and/or cutting of the tissue block. Accordingly, the control system 16 may adjust processing parameters such as, e.g., handling parameters (e.g., speed and/or force of the block handler 102, slide singulator 118 and/or microtome 104 among others or any combination thereof), speed and/or force of section cutting parameters by the microtome 104, imaging parameters for the image sensors and/or motion sensors (e.g., illumination and wavelength of light, exposure/aperture/gain/white balance, frame rate, shutter speed, etc.), among other processing parameters or any combination thereof to ensure high quality imaging and uniform and consistent sectioning.

In some embodiments, based on the sensor data and analyses described above, the processing device management server 24 may identify maintenance needs or likely future maintenance needs. In some embodiments, the processing device management server 24 automatically generate a notification to a user, e.g., at the administrative system 23, to recommend servicing of the tissue processing system 14 according to any identified operational failures, miscalibration or other faults and errors or other non-normal operations.

In some embodiments, the control system 16 may also communicate real-time operation data and sample data of the samples to the processing device management server 24, such that the real-time operation data and sample data is compliant with, e.g., HIPAA in the US and GDPR in the European Union, among other information privacy laws, regulations and standards, etc. In some embodiments, the processing device management server 24 may use the real-time operation data and the sample data to calculate statistics related to, e.g., sample block arrival times, process duration times, tissue images, order sizes, block mold sizes, tissue type, tissue area and other micro and macro tissue characteristics. In some embodiments, the processing device management server 24 may use the statistics to formulate trends in tissue sectioning, e.g., for product development, product optimization, business development, training, among other uses. In some embodiments, the processing device management server 24 may output the statistics and/or trends to a user, e.g., at the administrative system 23.

Accordingly, in addition to automatically controlling components of the tissue processing system 14, the control system 16 may also automatically monitor component feedback to analyze and/or upload component data such as, e.g., usage data, performance data, error and malfunction data, maintenance data, among other data for centralized management at the device management server 24. In some embodiments, each tissue processing system 14 of a network of tissue processing systems 14 may upload such data to the device management server 24. As a result, in addition to individual device management, the device management server 24 may aggregate component and device data to analyze and identify broader usage patterns, performance and error trends, coordinate maintenance and distribute tissue samples for more efficiently sectioning large quantities of tissue samples.

Example of a Barcode for Identifying a Tissue Sample and/or Section

Typically, the tissue sample (also referred to as a tissue sample block or sample block) is provided in a plastic cassette and is embedded in paraffin wax or a similar material. The plastic cassette provides the features for the sample block to be held in a microtome clamp. Once the sample block is secured in the microtome clamp for cutting (sectioning), the new block is first subjected to sectioning with relatively thick sections to remove the 0.1 mm-1 mm layer of paraffin wax on top of the tissue sample to expose the tissue sample. After removal of this superficial paraffin layer and when the complete outline of the tissue sample is exposed, then the block is ready to be sectioned according to processing protocol parameters. This process for removing this paraffin layer and exposing the large cross section of the tissue is referred to as block facing. Once this paraffin layer is removed, in clinical and research settings, the tissue is typically sectioned to 3 μm to 5 μm thickness. That is, when enough paraffin has been removed (the block is referred to as "faced"), subsequent block sectioning provides tissue sections for placement on glass slides for analysis (processed further for evaluation). The tissue sections cut from the sample block can be transferred to slides, such as, for example, using a tape transfer mechanism. In some embodiments, the process can be automated as, for example, disclosed in commonly assigned U.S. Publication No. 2017/0205317. Other examples of an automated apparatus, and variations thereof are disclosed in U.S. Publication No. 2017/0003309 and U.S. Publication No. 2017/0328818. The entire contents of these three publications are incorporated herein by reference. It is understood that the automated tissue apparatus provide examples of automated apparatus as the illumination/imaging systems and the quality control systems can be used with other automated apparatus.

Figure 3:
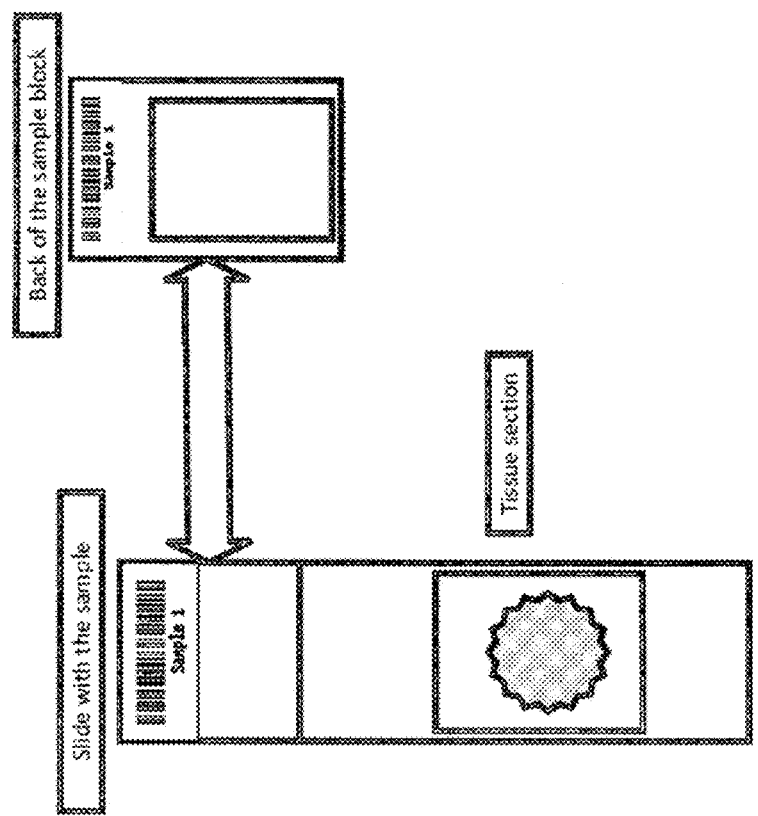
FIG. 3 is a section comparison of the sample block and the tissue section on the glass slide in accordance with aspects of embodiments of the present disclosure.

In reference to FIG. 3, incoming sample blocks include a label attached to the plastic cassette a barcode number. The barcode data, generated by LIMS software, provides information about the source of the tissue samples. For example, the barcode information includes an accession number and sample ID. In some embodiments, this information can also include the patient name and date when the specimen was obtained. Depending on the lab, additional information may be included, such as tissue processing protocols, e.g., explicitly defined or determined based on a type of the tissue and tests to be performed. In addition to the barcode, the label or the etching on the block could include human readable alpha-numeric version of the data. In some embodiments, the microtomy devices may be in communication with the LIMS enabling real-time LIMS updates to be correctly matched to the proper sample block from the initial pick-up by a robotic arm right through to actual tissue processing and delivering the tissue sections to slides. As is described in more detail below, the parameters for processing the sample block, including, e.g., a number of sections to be cut, a thickness of each section, a hydration time, among other processing parameters and combinations thereof, may be automatically entered into the tissue processing apparatus.

Example Data Flow for Automated Control of Components

Figure 4A:
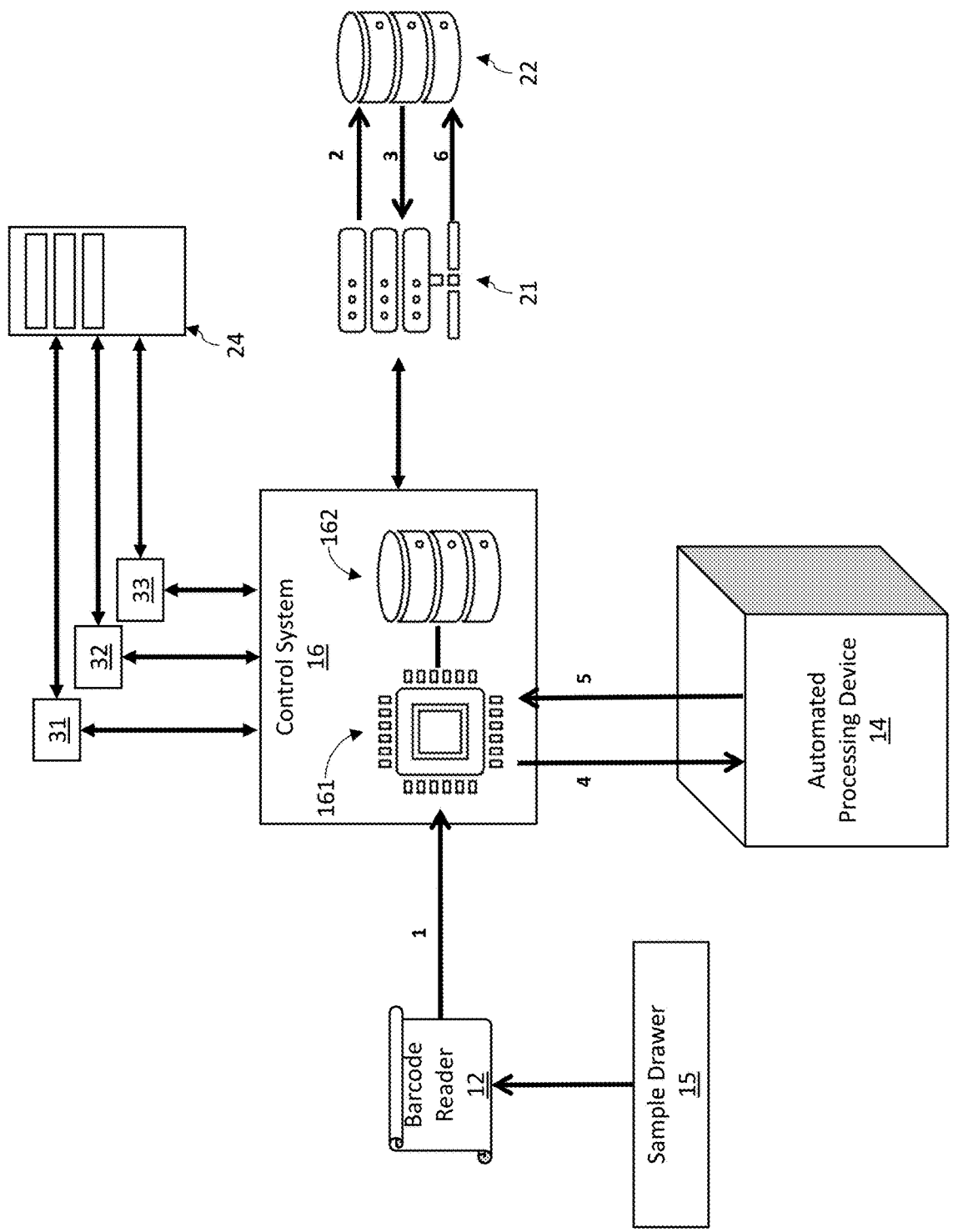
FIG. 4A is a diagram of a LIMS-connected tissue processing system of the present disclosure illustrating a LIMS-connected control system for automated control of tissue processing components according to automatically retrieved processing protocols from the LIMS in accordance with aspects of the present disclosure.
Figure 4B:
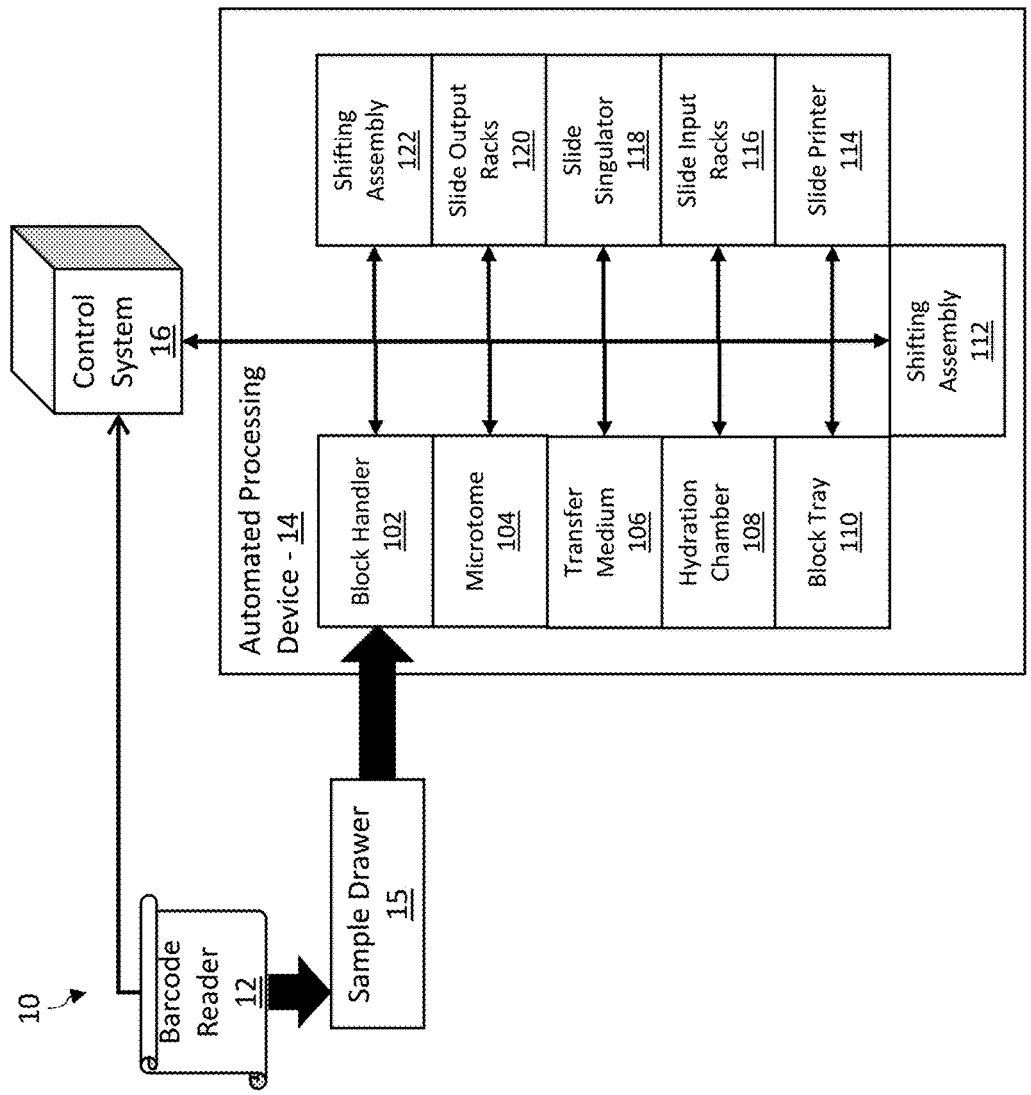
FIG. 4B is a schematic view of one embodiment of the automated tissue processing system of the present disclosure illustrating a control system automatically controlling a barcode reader in order to scan the label on the sample block and to automatically control tissue processing components according to processing protocols associated with the sample block and monitoring usage, consumables and maintenance data according to component performance in accordance with aspects of embodiments of the present disclosure.

FIGS. 4A and 4B depict block diagrams of a LIMS-connected automated tissue processing system of the present disclosure illustrating a LIMS-connected control system for automated control of tissue processing components in accordance with automatically retrieved processing protocols from the LIMS in accordance with aspects of embodiments of the present disclosure.

In reference to FIGS. 4A and 4B, retrieval of processing protocols from the LIMS 22 for automated control of the tissue processing system 14 may be effectuated through communication with a barcode reader 12, the tissue processing system 14 and the LIMS 22.

In some embodiments, the barcode reader 12 is provided to scan the barcode associated with the incoming sample block. The scanning can take place at the point of tissue sectioning in response to the presentation of the sample block. In some embodiments, for example, the sample block may be placed in a sample drawer. The barcode information is used to query processing protocol data from the LIMS 22 to determine the number of sections that needs to be cut, thickness of the sections, hydration times and other processing parameters.

In some embodiments, the control system 16 may execute instructions that control various of the components of the tissue processing system 12 according to the processing protocol data. In some embodiments, the control system 16 may include a processor 161 and a local storage 162 for instructing the various components according to processing protocol data for a given sample block and tissue section and for collecting test results and summaries.

In some embodiments, the processor 161 may include any type of data processing capacity, such as a hardware logic circuit, for example an application specific integrated circuit (ASIC) and a programmable logic, or such as a computing device, for example, a programmable processor. In some embodiments, the processing device may include data-processing capacity provided by the programmable processor. In some embodiments, the programmable processor may also include one or more programs including software instructions stored in memory. If an embodiment uses a hardware logic circuit, the logic circuit generally includes a logical structure that operates the systems, devices and components of the tissue processing system 14.

In some embodiments, upon receipt of the processing protocol data, the processor 161 may determine control instructions associated with each processing protocol parameter. For example, the processor 161 may produce instructions for a microtome 104 for setting a thickness for a number of sections according to the processing protocol data such that the microtome 104 sections tissue from the tissue sample block as per the processing protocols for the tissue sample block. Similarly, the processor 161 may produce instructions according to the processing protocol data to control a hydration chamber 108 to perform hydration of a section and/or sample block according to a hydration time of the processing protocols for the tissue sample block, to control a block handler 102 and/or transfer medium 106 and/or slide adhesive coater 112, etc. based on the sensitivity of the tissue. In some embodiments, the processor 161 may control or otherwise produce instructions and/or parameters to automatically instruct each component of the system 12 according to the processing protocol data, such as, e.g., the tissue processing system 14, including components thereof such as those described below with reference to FIGS. 6A through 6C, including, e.g., a block handler 102, a microtome 104, a transfer medium 106, a hydration chamber 108, a block tray 110, a tape handling system 122, a slide adhesive coater 112, a slide printer 114, a slide input racks 116, a slide singulator 118, a slide output racks 120, among other suitable components.

In some embodiments, the processor 161 may both control and monitor operations of each of the block handler 102, the microtome 104, the transfer medium 106, the hydration chamber 108, the block tray 110, the tape handling system 122, the slide adhesive coater 112, the slide printer 114, the slide input racks 116, the slide singulator 118, the slide output racks 120, among other suitable components. Accordingly, during sectioning of a tissue sample block, the processor 161 may monitor performance of each component to track, e.g., component error and performance data 31 including component and device errors, positioning images from one or more onboard camera(s), image sensor data (e.g., illumination, light wavelength, color channel, etc.), motor actuation, motor current, motor voltage, tissue sample block images via the camera(s), tissue section images via the camera(s), system quality control check warning types, sample block arrival times, process duration times, tissue images, order sizes, block mold sizes, tissue type, tissue area and other micro and macro tissue characteristics. The control system 16 may also or alternatively monitor device or component usage data or workflow data including durations and times of operations, user inputs, tissue sample block counts, tissue sample block types, among other usage and workflow data. The control system 16 may also or alternatively monitor consumable usage data 32 including consumable material use, consumable material fill status, warnings, among other consumable usage data or any combination thereof. As a result, in some embodiments, the processor 161 may upload the tissue processing system component data 31, 32 and 33 to a processing device management server 24. In some embodiments, the tissue processing system component data may be provided to the management server 24 in real-time, upon a delay, continuously, in periodic batches (e.g., similar to the batches of queries and processing protocol data described above), or any combination thereof.

In some embodiments, at step 1 of FIG. 4A, upon a sample block being presented in the sample drawer 15, the control system 16 may receive from a barcode reader 12 barcode data of a barcode associated with the sample block. The barcode reader 12 may read the barcode and extract, e.g., sample data such as the sample ID.

In some embodiments, the barcode reader 12 extracting the sample data may trigger the control system 16 to initiate a process for obtaining processing protocol data for the sample block. In some embodiments, a closing of the sample drawer 15 may instead trigger the process, or any other suitable action that may be automatically recognized by the control system 16 as indicating receipt of the sample block.

In some embodiments, the control system 16 may utilize the sample data, including the sample ID, to obtain processing protocol data for the sample block. In some embodiments, the local storage 162 may store processing protocol data for one or more sample blocks. Accordingly, the processor 161 may receive the sample ID and reference the processing protocol data stored in the local storage 162, e.g., using a suitable query language or search algorithm. Where the processing protocol data associated with the sample ID is found in the local storage 162, the processor 161 may extract the processing protocol data. However, where the local storage 162 does not have any records for processing protocol data associated with the sample ID, then the processor 161 may engage with the middleware 21 to obtain the processing protocol data from the LIMS 22.

In some embodiments, the data storage solution of the local storage 162 may include, e.g., a suitable memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, the middleware 21 may utilize the sample ID, among any other barcode data, to generate a database query. In some embodiments, the database query may be in any suitable query language depending on the database management system of the LIMS 22. In some embodiments, the database query may be communicated, at step 2 of FIG. 4A, to the LIMS 22.

In some embodiments, the LIMS 22 may receive the database query and automatically identify data stored therein related to the sample ID. In some embodiments, a sample ID is a unique indicator assigned to the sample block. A patient may have tissue in multiple sample blocks with each sample block having a unique sample ID identifying, specifically, the corresponding sample block. Data related to each patient and to each sample block of each patient may be stored in the LIMS 22. Accordingly, referencing the sample ID via the database query may cause the LIMS 22 to identify and return data for the particular sample block of a particular patient associated with the sample ID.

In some embodiments, the data may include processing protocol data representing processing protocols and processing parameters to be performed on the sample block. For example, processing protocols and sectioning parameters may include microtome protocol information, such as, e.g., a sample tissue type, microtome parameters (e.g., tissue section thicknesses to be cut from the sample block, number of tissue sections to be cut, etc.), an identifier or barcode for each tissue section to be cut from the sample block, an urgency of a sample (e.g., routine or urgent/STAT), among other information related to the processing of the sample block by the tissue processing system 14 and components thereof.

In some embodiments, the processing protocol data may be returned, at step 3 of FIG. 4A, by the LIMS 22 to the control system 16 via the middleware 21 in response to the database query. In some embodiments, the control system 16 may store in the local storage 162 the processing protocol data for the sample block. In some embodiments, the control system 16 may implement the processor 161 to determine additional processing parameters for the sample block based on the processing protocol data. For example, in some embodiments, the processor 161 may use the sample tissue type to determine a humidification time for the sample, e.g., by referencing a table of humidification times according to tissue types in the local storage 162, by calculating the humidification time with a suitable algorithm, or by any other suitable automated technique. Such additional sectioning parameters may be stored with the received processing protocol data with reference to the sample ID in the local storage 162.

In some embodiments, the processor 161 may use the processing protocol data and additional sectioning parameters in the local storage 162 to control components of the system 12, including the tissue processing system 14, to process the sample block and automatically section the tissue of the sample block without user input. In some embodiments, the processor 161 may control the microtome to cut one or more tissue sections and transfer the cut tissue sections to the slides that are also labeled with the barcode data associated with the sample block to create association of the sample block metadata with the tissue sections on the slides. In some embodiments, the slides are labeled based on the sample block barcode with iterative variations. For example, if the block barcode is 12345, the first slide barcode could be 12345-a and the second one could be 12345-b and so on. The slide labels are printed just in time before tissue transfer to the slide.

In some embodiments, the tissue sections may be transferred to the slides using a tape or by any other suitable transfer mechanism with any suitable transfer medium 106. It should be noted that transfer medium 106 other than tape can be utilized. Therefore, references to tape herein are used for convenience as the systems and methods disclosed herein are fully applicable to other transfer medium not just tape.

In some embodiments, during or upon sectioning the sample block, the processor 161 may, at step 5 of FIG. 4A, retrieve from the components of the tissue processing system 14 the status of the sample block with respect to progress relative to the processing protocols and sectioning parameters. In some embodiments, each component may produce a confirmation of successful or unsuccessful completion of operations for each component according to the processing protocol data. The confirmation may reference the sample ID and/or a specific slide or section ID from the sample block and generate a status indicator of operations performed relative to the sample ID and/or section ID. For example, upon completion of cutting a section from the sample block, the microtome 104 may generate an indicator with reference to the sample ID confirming completion of the count of the section and the thickness of the section.

In some embodiments, the processor 161 may provide, via the middleware 21 at step 6 of FIG. 4A, the confirmation to the LIMS 22 to store the status of processing the sample block with reference to the sample ID. The control system 16 may provide the confirmation to the LIMS 22 via a suitable communication technique, such as, e.g., an API request, an HTTP request, a database operation, or other technique. Accordingly, the control system 16 may provide real-time updates to the processing data of a sample block according to the sample ID. Thus, user error is minimized, and the accuracy and efficiency of processing is improved that is present in the manual process.

Figure 5:
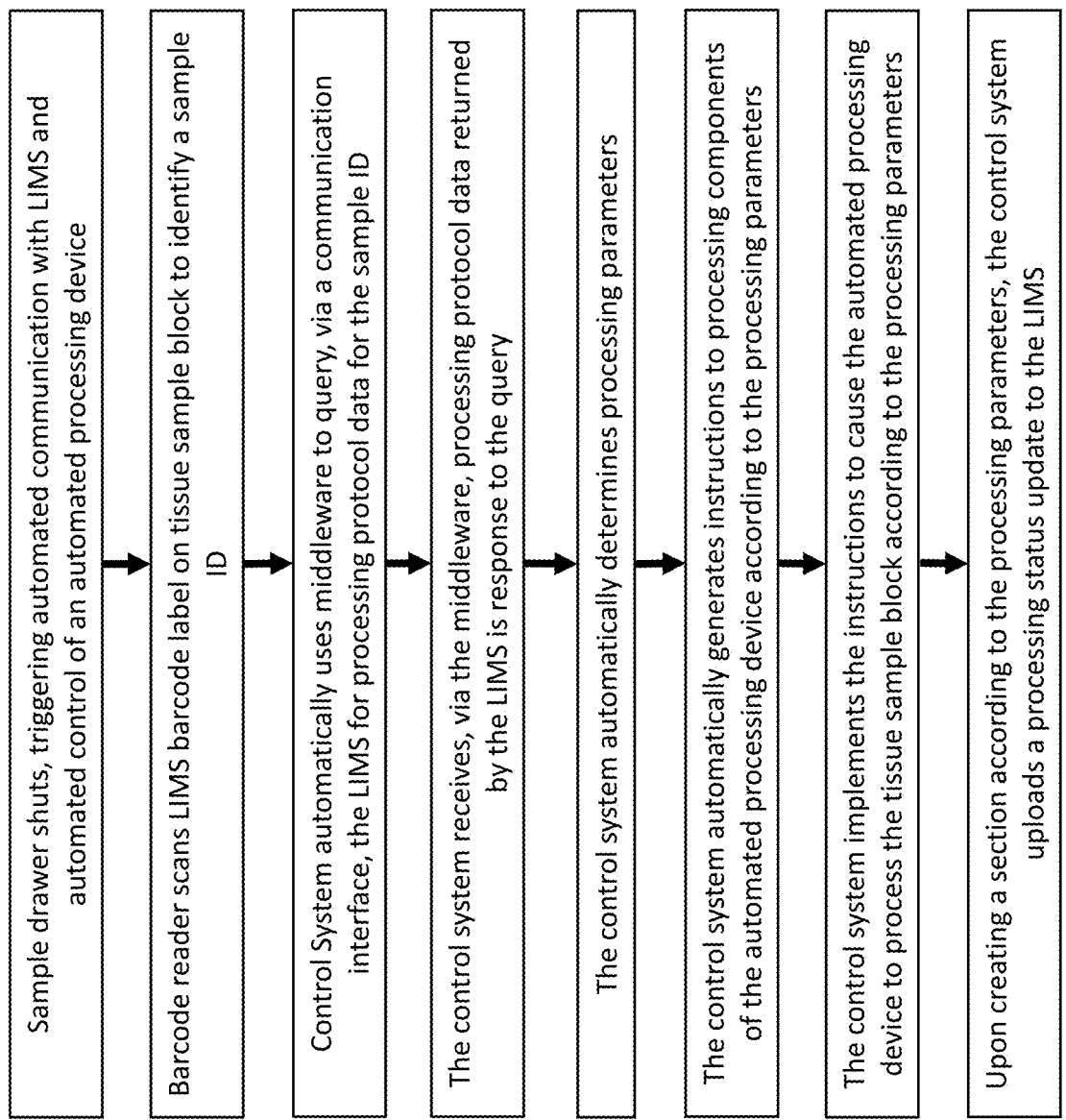
FIG. 5 is a flow chart illustrating one embodiment of the automated steps of the tissue processing system implementing direct or networked communication with a LIMS to automatically carry out tissue sample sectioning upon provision of a tissue sample block in accordance with aspects of embodiments of the present disclosure.

With reference to FIG. 5, the automated tissue processing system 12 and tissue processing system 14 are automatically controlled by a control system according to processing protocol data queried from the LIMS 22 for a particular sample block according to the illustrative flowchart. In some embodiments, the processing protocol data may be combined with information from the multiple sensors, detectors and cameras inside the device for fully automated control of the automated tissue processing system 12.

In some embodiments, a tissue sample block is provided to a sample drawer. Upon the sample drawer being shut and a barcode reader reads a sample ID identifier the tissue sample block, a control system is triggered to automatically control components of the tissue processing system 14 and to initiate a connection with the LIMS 22. In some embodiments, the control system automatically controls a barcode reader (or any other reader such as RFID or NFC) to scan a LIMS barcode label on the tissue sample block to identify a sample ID for the tissue sample block.

In some embodiments, using the sample ID, the LIMS uses a database query to a database or database management system of the LIMS. The database query may include the sample ID, such as processing protocol data indicating processing protocol information for the tissue sample block. In some other embodiments, the LIMS system pushes information to the tissue processing system without getting a request or barcode information. In this case, tissue processing system may create a local database of sample information, e.g., in a data store such as the local storage 162.

The control system receives, via the middleware, a return from the LIMS including the processing protocol data returned in response to the database query.

The control system may automatically determine processing and system parameters for components of the tissue processing system based on the processing protocol data.

The control system may automatically generate instructions for the tissue processing system components according to the processing parameters to cause the tissue processing system to process the tissue sample block according to the processing parameters.

Based on the instructions, the control system communicates with each tissue processing system component according to the processing parameters to implement the instructions and cause the microtome to process the tissue sample block according to the processing parameters.

Upon processing a section of tissue from the sample block according to the processing parameters and in response to the control system instructions, the control system may communicate the completed processing of the section to the LIMS to update a processing status of the tissue sample block. In some embodiments, the section of tissue may be transferred to a glass slide upon section. Thus, in some embodiments, the communication of the completed processing may take place before transfer to the glass slide, or after transfer to the glass slide. In some embodiments, the communication takes place after transfer to the glass slide and includes a reference to the sample ID as well as to a slide ID identifying a unique slide identifier for the section of tissue.

In some embodiments, the processing status can include, e.g., a processing count indicating a number of sections completed and/or a number of sections of each specified thickness completed, a slide identifier associated with the slide of each section, the time it took for processing the block, preliminary tissue images, among other processing information related to the sectioned tissue.

Example of an Automated Monitoring of Operating Parameters

Referring back to FIG. 1B, the tissue processing system may be provided with a control system to monitor and log operating parameters and component measurements from components of the tissue processing system, the measurements being indicative of usage of each component, performance of each component, functionality or malfunctions or errors of each component, use of materials such as slides, sprays, adhesives, cutting blades, etc., among other measurements directly from component feedback or inferred from component feedback.

In some embodiments, component errors may be logged. For example, rates of system quality control check warnings, system quality control check warning types, error flags, overheating or other environmental warnings, motor malfunctions, among other component error data, may be collected. This component error data may be logged, cached, stored, or otherwise maintained.

In some embodiments, consumable usage may be logged, such as, a rate of use of consumables, a frequency of use of consumables, time or duration of use of consumables, etc. For example, a microtome may use blades that dull or corrode over time, a transfer mechanism may employ slides onto which tissue sections are transferred, adhesives, coatings, sprays, and other materials may be employed in the processing of tissue samples. This consumable use data may be logged, cached, stored, or otherwise maintained.

Similarly, in some embodiments, component performance may be logged based on received component operating characteristics. For example, motion sensor data, component actuation detectors, image sensors (e.g., cameras), motor current measurements, among other component performance data may be monitored and collected. This performance data may be logged, cached, stored, or otherwise maintained.

In some embodiments, workflow data such as operation data and sample data including HIPAA and GDPR compliant data of the samples may also be monitored and logged. For example, e.g., sample block arrival times, process duration times, tissue images, order sizes, block mold sizes, tissue type, tissue area and other micro and macro tissue characteristics may be logged during processing of each sample.

In some embodiments, continuously or periodically, the tissue processing system may connect to a device management server to upload the logs for real-time analysis and visualization of device attributes.

In some embodiments, the device management server may determine metrics and attributes of the tissue processing system such as, e.g., consumable usage rates, device usage metrics and predictive maintenance data (e.g., predictive maintenance needs and alerts or status). In some embodiments, based on the collected component errors, consumable usage, component performance and/or workflow data described above, consumable usage rates, device usage metrics and predictive maintenance data may be automatically determined by the device management server. In some embodiments, the collected data may be aggregated with one or more additional tissue processing systems to improve predictive accuracy (e.g., of maintenance predictions) and better capture processing usage statistics, consumable usage rates (e.g., rates of blade dulling, spray coating dispensation rates, adhesive layer uniformity on the glass slide, consumable waste, waste in general. anonymized patient statistics, etc.). thus, the device management server may leverage multi-device data collection to better analyze and understand device performance, degradation, use, and business opportunities.

In some embodiments, the performance data and component error data, such as the motor current measurements, rate of system quality control check warnings, system quality control check warning types, and other data, may be used to determine whether the tissue processing system is operating within specifications. For example, the performance data and/or error data may be compared to operational values according to the specifications for the tissue processing system to identify states indicative of operational failures, miscalibration or other faults and errors.

In some embodiments the performance data may be analyzed for device usage metrics, maintenance analysis and predictive maintenance recommendations. In an illustrative example, in some embodiments, the image sensor may be calibrated for illumination power and wavelength in the tissue processing system based on calibration targets. Based on the calibration, the image sensor data may be used to measure illumination and wavelength of light in the tissue processing system to identify discrepancies indicative of operational failures, miscalibration or other faults and errors.

In another illustrative example, the image sensor data may be used to track operation and accuracy of processing operations including the positioning and processing of sample blocks. For example, the image sensor may capture images along a visible axis of sample block, tissue section and/or component position information. Objects in images may automatically identified, e.g., using a suitable image recognition technique (e.g., machine learning model, image matching model, or other technique) as the sample block, tissue section and/or component position information, and compare the position information thereof with commanded positions according to the processing protocols to identify discrepancies indicative of operational failures, miscalibration or other faults and errors. Similarly, motion sensors may provide motion data associated with components of the tissue processing system. For example, the motion data may be compared with actuation commands to identify discrepancies indicative of operational failures, miscalibration or other faults and errors.

Similarly, in some embodiments, the device management server may use the workflow data to analyze and determine statistics and trends related to, e.g., sample block arrival times, process duration times, tissue images, order sizes, block mold sizes, tissue type, tissue area and other micro and macro tissue characteristics. Thus, the device management server may use the statistics to formulate trends in tissue processing, e.g., for product development, product optimization, business development, training, among other uses.

In some embodiments, the device management server may use the consumable usage data to, e.g., consumable order or restocking frequencies, low consumable levels, among other states and analytics related to consumable use. For example, blade dulling may be projected based on the frequency and duration of use of a microtome, or spray fill levels and spray waste may be analyzed based on spray fill levels and a number of tissue sections processed, among other analyses.

In some embodiments, based on the consumable usage rates, device usage metrics and predictive maintenance data, the device management server may generate visualization for technician to display the consumable usage rates, device usage metrics and predictive maintenance data. Accordingly, a technician accessing a dashboard or other user interface for the device management server may easily ascertain and real-time state of one or more tissue processing systems, identify lab and tissue processing system demands and usage trends, maintenance needs, or other information or any combination thereof.

Example of an Automated Tissue Processing Workflow

FIGS. 6A, 6B, 6C and 7, illustrate an example embodiment of an automated system for the implementation of the above-described methods. It should, however, be noted that the methods and systems described above can be implemented in a manual microtomy process or other automated microtomy processes.

Figure 6A:
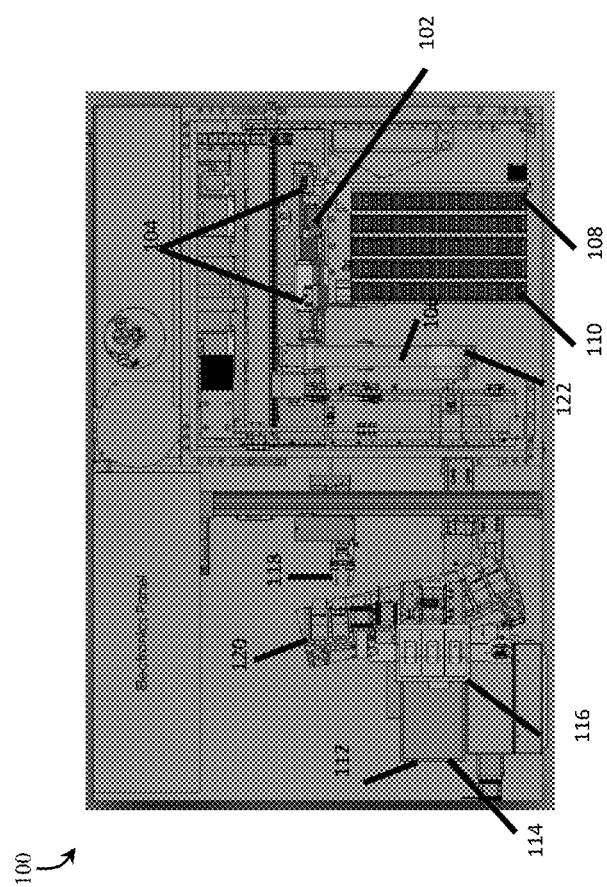
FIG. 6A is an elevated view illustration of a tissue processing system layout in accordance with some embodiments of the present disclosure in accordance with aspects of embodiments of the present disclosure.
Figure 6B:
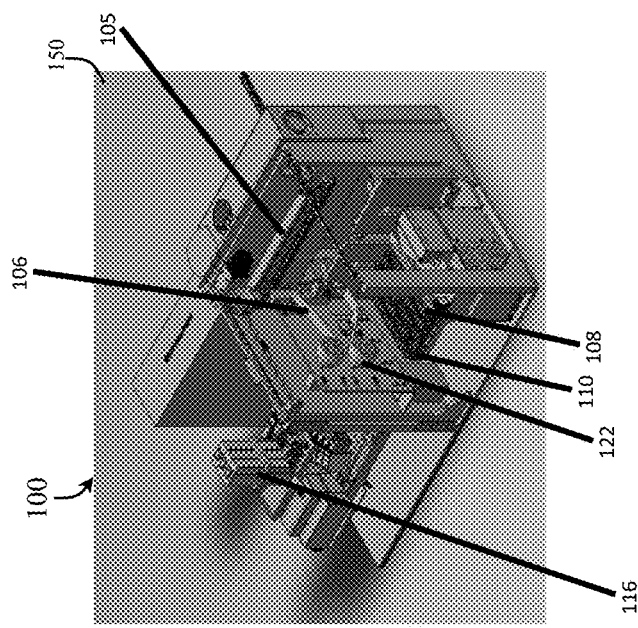
FIGS. 6B and 6C are isometric view illustrations of a tissue processing system layout in accordance with aspects of embodiments of the present disclosure.
Figure 6C:
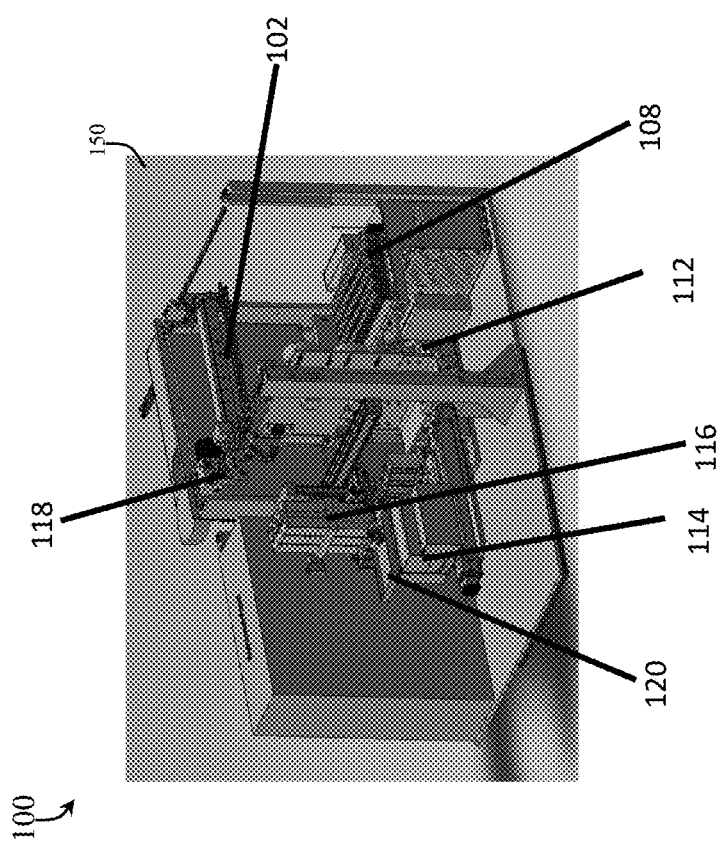

Referring to FIGS. 6A-6C, in some embodiments, an automated tissue processing system 100 is provided to enable automated tissue section preparation from block to slide. The system 100 can be designed to include a first section for cutting samples from the sample blocks. In some embodiments, the first section, for example as shown in FIG. 6B, can include a block handler 102, at least one microtome 104, a transfer medium 106 (e.g., a tape), a hydration chamber 108, and a block tray 110. The block handler 102, at least one microtome 104, the transfer medium 106 (e.g., a tape), the hydration chamber 108, and the block tray 110 can be designed to operate together according to automated control by a control system (e.g., control system 16 as described above) according to processing protocol data received from a LIMS (e.g., LIMS 22 described above) to organize, face, hydrate, section biological samples from sample blocks and transfer the tissue sections to slides using any combination of systems and methods implemented via instructions executed by the control system 16 according to the processing protocol data and processing parameters retrieved from the LIMS 22 combined with real time sensors examining the tissue and block (for example, if the protocol requests 5 slides, but tissue thickness only allows 3, the control system may stop after 3 cuts when using camera and other sensors real time information).

In some embodiments, the system 100 can include a transfer medium 106 (e.g., a tape) to receive the sample slices taken from the sample block, for example, by a microtome 104. The transfer medium 106 can include any combination of materials or surfaces that are able to receive a sectioned sample from a microtome 104 and transport the sectioned sample to another location. In some embodiments, the transfer medium 106 can include at least one adhesive surface capable of removing, receiving, and/or transporting a sectioned sample from a microtome 104 after it has been cut from the sample block. For example, the transfer medium 106 can include any combination of tapes, such as for example, a tape roll, windowed tape, etc. The transfer medium 106 can include or otherwise be a part of a larger mechanism for transferring a sectioned sample. For example, the transfer medium 106 can be an adhesive tape wrapped over a combination of pulleys, wheels, spools, conveyers, etc. designed to enable the transfer medium 106 move a sectioned sample thereon from one location to another. Any other combination of transfer mediums can be used without departing from the present disclosure. For example, the transfer medium 106 can be a belt with ridges, dips, etc. designed to grasp and/or hold the sectioned samples.

In some embodiments, the transfer medium 106 can transfer sectioned samples from its surface to a tape handling system 122 for transferring the sample onto a slide. The tape handling system 122 can be designed to remove the samples adhered to the transfer medium 106 and place the samples on one or more slides. In some embodiments, transferring by the tape handling system 122 can include separating the actual tissue sample material to isolate the sample from the non-sample material. The tape handling system 122 can use any combination of systems or methods to separate an entirety or a portion of the biological sample for the surrounding the paraffin material such that only the biological sample material is transferred to the slides. For example, the tape handling system 122 can core out a portion of the biological sample to be removed from the transfer medium 106. In some embodiments, the non-sample material (e.g., paraffin material) can remain on the transfer medium 106 to be discarded with the used transfer medium 106.

Continuing with FIGS. 6A-6C, the system 100 can also include a second section, for example as shown in FIG. 6C, having a combination of mechanisms to prepare and provide a slide to receive a biological sample cut from the block (e.g., in the first section) from the transfer medium 106 (e.g., a tape) and processing the slide for analysis. In some embodiments, the combination of mechanisms for processing the slide in the second section can include a slide adhesive coater 112, a slide printer 114, slide input racks 116, a slide singulator 118, and slide output racks 120. This combination of mechanisms can work together to prepare the slide to receive a sample, secure the sample on the slide, and deliver/organize the slide with the sample to a rack for later use according to instructions executed by the control system 16 to control the slide adhesive coater 112, the slide printer 114, the slide input racks 116, the slide singulator 118, and the slide output racks 120 according to the processing protocol data and processing parameters retrieved from the LIMS 22 combined with real time sensor data. In some embodiments, initial blank slides can be provided within a storage rack of a slide assembly for pre-processing. For example, the slide assembly can include one or more slide input racks 116 for storing a plurality of blank slides. The slide assembly can store and organize slide in a large capacity, for example, 200 slides.

In some embodiments, the slide singulator 118 can be designed to grab a slide from a stack of slides within the input racks 116. The slide singulator 118 can includes any combination of mechanisms capable of picking up and transporting the slides. For example, the slide singulator 118 can be an actuating mechanical arm, a gantry, etc. Before being processed, the slide singulator 118 can provide slides for a quality control step. During the quality control step, an analysis can be performed on the slide to ensure the slide is suitable to receive a sample. For example, the quality control can include the slide singulator 118 transporting the slide in view of a camera to provide image data for image processing to identify any potential issues with the slide, check an orientation of a slide, a condition of a slide, etc. If the slide fails the quality control inspection it can be discarded, if it passes, it can be transported within the system 100 to be prepped to receive a sample. In some embodiments, the slide can be transported to the slide printer 114 to receive an identification information printed thereon. For example, information about a sample type, sample origin, sample date, etc. can be printed on the slide. The identification information can include any combination of machine readable and human readable code or text such that the slides and the content thereof can be properly identified and tracked. For example, the slide printer 114 can print a machine-readable barcode on the slide to identify the slide number, batch, contents, etc.

In some embodiments, the slide can be transported to the slide adhesive coater 112 to be coated by an adhesive material. For example, the slide adhesive coater 112 can coat an ultraviolet (UV) activated adhesive on the slide, apply an UV activated adhesive tape, or any combination of adhesive systems or methods. In some embodiments, the adhesive can be applied in one layer or in multiple layers. The numerous layers can be applied such that the slide receives a uniform coating of the adhesive to ensure clear viewing through the slide layer. In some embodiments, the slide can be inserted into the slide input racks 116 already preprocessed or partially pre-processed.

Once the slide has been processed by the slide printer 114 and the slide adhesive coater 112, the slide can be transported to the transfer medium 106 to receive a sample from the transfer medium 106. For example, the slide can be transported to the tape handling system 122 to receive sectioned sample block samples from transfer medium 106 (e.g., a tape mechanism). In some embodiments, prior to transferring the sample to a slide, the tape handling system 122 can include one or more cameras to perform image processing to determine whether samples of the transfer medium 106 are suitable for adhesion to a slide. For example, the image processing can inspect the sample to determine whether it is suitable for placement on a slide, according to, e.g., tolerance specifications of the processing protocol data retrieved from the LIMS 22. If it is not suitable the sample can be discarded and the transfer medium 106 can be advanced to the next sample. When a sample is suitable for placement on a slide, it can be applied to the slide. In some embodiments, the image processing can inspect the sample after it has been adhered to the slide to determine whether or not the placement of the sample is of sufficient quality. For example, the image processing can inspect the slide to determine whether the sample is cleanly adhered to slide, no bubbling, tearing, paraffin remanence, etc. If a slide is not suitable, the slide can be discarded instead of being placed in the slide output racks 120.

In some embodiments, the completed slides can be transported, by the singulator 118, to be stored in the slide output racks 120. The slides can be stored in the slide output racks 120 in a predetermined order and/or organizational method such that the next steps in which the slides will be used can easily locate and remove the slides.

As noted above, in some embodiments, the system 100 can include a quality control imaging system as disclosed, for example, in U.S. Application No. 62/980,203, filed on Feb. 22, 2020, which is incorporated herein by reference in its entirety.

Figure 7:
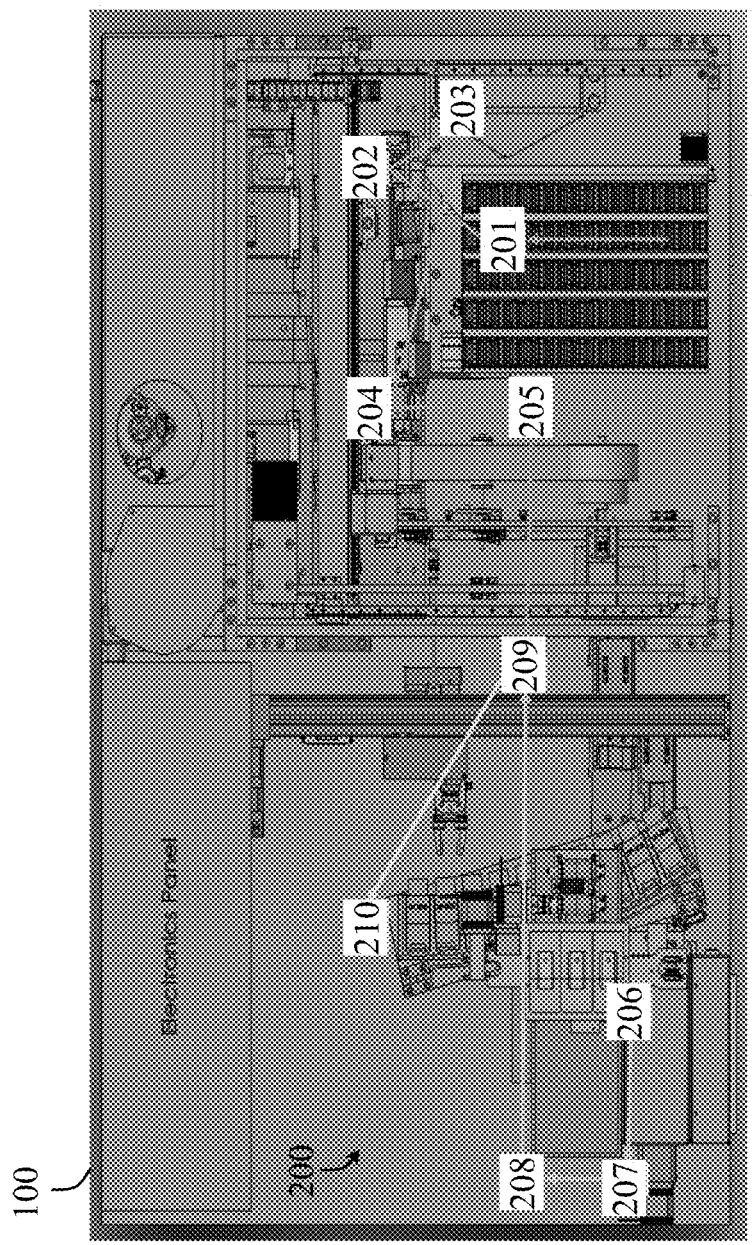
FIG. 7 is a flow chart illustrating the processing of sample blocks in the automated tissue processing system in accordance with aspects of embodiments of the present disclosure.

Referring to FIG. 7, in some embodiments, system 100 can be used to transfer samples from sample blocks to slide following the stages provided in the automated process flow 200. FIG. 7 shows the process flow of a block to slide steps used in the system 100 provided in FIGS. 6A-6C. At step 201, the sample blocks can be loaded in the system 100. For example, one or more sample blocks, with tissue samples embedded within a paraffin block, can be loaded into trays 110 and placed within the system 100. In some embodiments, loading the block into the trays 110 triggers the barcode reader 12 to read a barcode on the block and extract the barcode data. In some embodiments, the control system 16 may use a sample ID identifying the block in the barcode data to query the LIMS 22 (e.g., via suitable middleware 21) to retrieve processing protocol data.

At step 202, one of the sample blocks can be moved from the tray 110 to a microtome 104 for facing. For example, a sample block can be transported by a handler 102 and placed within a chuck of a facing microtome 104 to be faced. In some embodiments, the control system 16 uses the processing protocol data to set parameters of the microtome 104 for processing the sample block. In some embodiments, the parameters may include, e.g., a number of tissue sections, a thickness of each tissue section, among other microtome parameters. The control system 16 may then control the microtome 104 to operate to section the sample block according to the parameters.

At step 203, the faced sample block can be moved to the hydration chamber 108 to be hydrated and cooled. For example, a sample block can be transported by block handler 102 and placed within the hydration chamber 108 for a predetermined period of time. In some embodiments, the predetermine period of time is determined by the control system 16 according to the processing protocol data retrieved from the LIMS 22. In some embodiments, upon retrieving the processing protocol data, the control system 16 may extract the predetermined period of time for the hydration time from the processing protocol data or determine predetermined period of time based on the processing protocol data. The control system 16 may then instruct the hydration chamber 108 to provide hydration and cooling to the faced sample block once the faced sample block is moved into the hydration chamber 108, e.g., by using a suitable timer, counter, or other time keeping mechanism. In some embodiments, upon completion of the hydration time, the control system 16 may control the hydration chamber 108 to cease hydration and may control the block handler 102 to remove the sample block from the hydration chamber 108.

After sufficient hydration has been provided, at step 204, the sample block can be moved to a microtome 104 for processing. For example, a sample block can be transported by a handler 102 and placed within the chuck of a processing microtome 104 to be polished and sectioned. The block can be provided to the same microtome 104 that performed the facing or a different microtome 104. In some embodiments, the microtome 104 may section the sample block into a predetermined number of sections at a predetermined thickness. In some embodiments, the predetermined thickness is a constant thickness for all sections from the sample block or is a varying thickness that different across all sections from the sample block or is any combinations of varying and constant across numbers of sections sectioned from the sample block. In some embodiments, the number of sections and the thickness of each section is set by the control system 16 in response to the processing protocol data. In some embodiments, the control system 16 may extract the predetermined number of sections and/or the predetermined thickness from the processing protocol data, determine the predetermined number of sections and/or the predetermined thickness based on the processing protocol data, or any combination thereof. The control system 16 may then instruct the microtome 104 to section the sample block to produce the predetermined number of sections at the predetermined thicknesses once the sample block is provided into the microtome 104. Thereafter, each sectioned sample can be transferred to the transfer medium 106.

In some embodiments, to achieve the section thickness of the section protocol data, the control system 16 may determine a chuck forward amount that is a distance to move the cutting tool held by the chuck that corresponds to the section thickness. Thus, the control system 16 may automatically control the microtome 104 to perform each processing according to a section thickness indicated in the processing protocol data. Moreover, the control system 16 may monitor the operations of the microtome 104 to upload, e.g., chuck motor operations, chuck movement distances, etc. to a processing device management server 24.

At step 205 the sectioned samples on the transfer medium 106 can be transferred to a slide.

Simultaneous to or subsequent to steps 201-205, steps 206-208 can be performed to prepare one or more slides for combining with the sectioned samples from the sample block. At step 206, a microscope slide can be selected and obtained from a stack of new slides. For example, the slide singulator 118 can select and pull a slide from a stack of slides stored within a rack 116 of blank slides. At step 207, identifying information can be printed on the selected slide. For example, the slide can be placed within the slide printer 114 to have a machine-readable barcode printed thereon. At step 208, an adhesive material can be coated on the selected slide. For example, the slide can be placed within the slide adhesive coater 112 to have a UV activated adhesive coated thereon. At step 209, the tissue sample can be transferred from the transfer medium 106 to the UV adhesive coated slide. Additionally, during step 209, the slide can be imaged for onboard diagnostics, quality control, and sample tracking. For example, one or more cameras can be used to capture image data to be processed by an image processor for predetermined quality thresholds. Once the slide has passed the quality control, at step 210 the completed tissue slide can be moved to the output rack 120 to be stored for future analysis.

Example Computing/Network Architecture

Figure 8:
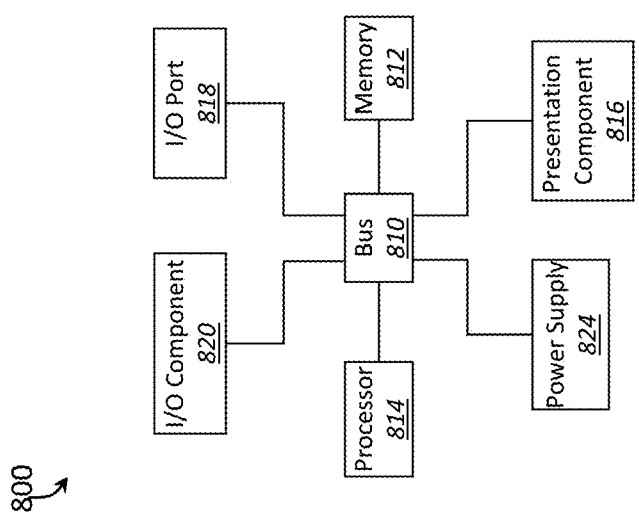
FIG. 8 is a diagrammatic illustration of a high-level architecture for implementing processes in accordance with aspects of embodiments of the present disclosure.

Any suitable computing device can be used to implement the computing devices and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 800 is depicted in FIG. 8. The computing device 800 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 800 is depicted for illustrative purposes, embodiments of the present invention may utilize any number of computing devices 800 in any number of different ways to implement a single embodiment of the present invention. Accordingly, embodiments of the present invention are not limited to a single computing device 800, as would be appreciated by one with skill in the art, nor are they limited to a single type of implementation or configuration of the example computing device 800.

The computing device 800 can include a bus 810 that can be coupled to one or more of the following illustrative components, directly or indirectly: a memory 812, one or more processors 814, one or more presentation components 816, input/output ports 818, input/output components 820, and a power supply 824. One of skill in the art will appreciate that the bus 810 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 800 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 800.

The memory 812 can include computer-storage media in the form of volatile and/or nonvolatile memory. The memory 812 may be removable, non-removable, or any combination thereof. Exemplary hardware devices are devices such as hard drives, solid-state memory, optical-disc drives, and the like. The computing device 800 can include one or more processors that read data from components such as the memory 812, the various I/O components 816, etc. Presentation component(s) 816 present data indications to a user or other device. Exemplary presentation components include a display device, speaker, printing component, vibrating component, etc.

The I/O ports 818 can enable the computing device 800 to be logically coupled to other devices, such as I/O components 820. Some of the I/O components 820 can be built into the computing device 800. Examples of such I/O components 820 include a microphone, joystick, recording device, VR glasses, scanner, printer, wireless device, networking device, and the like.

Figure 9:
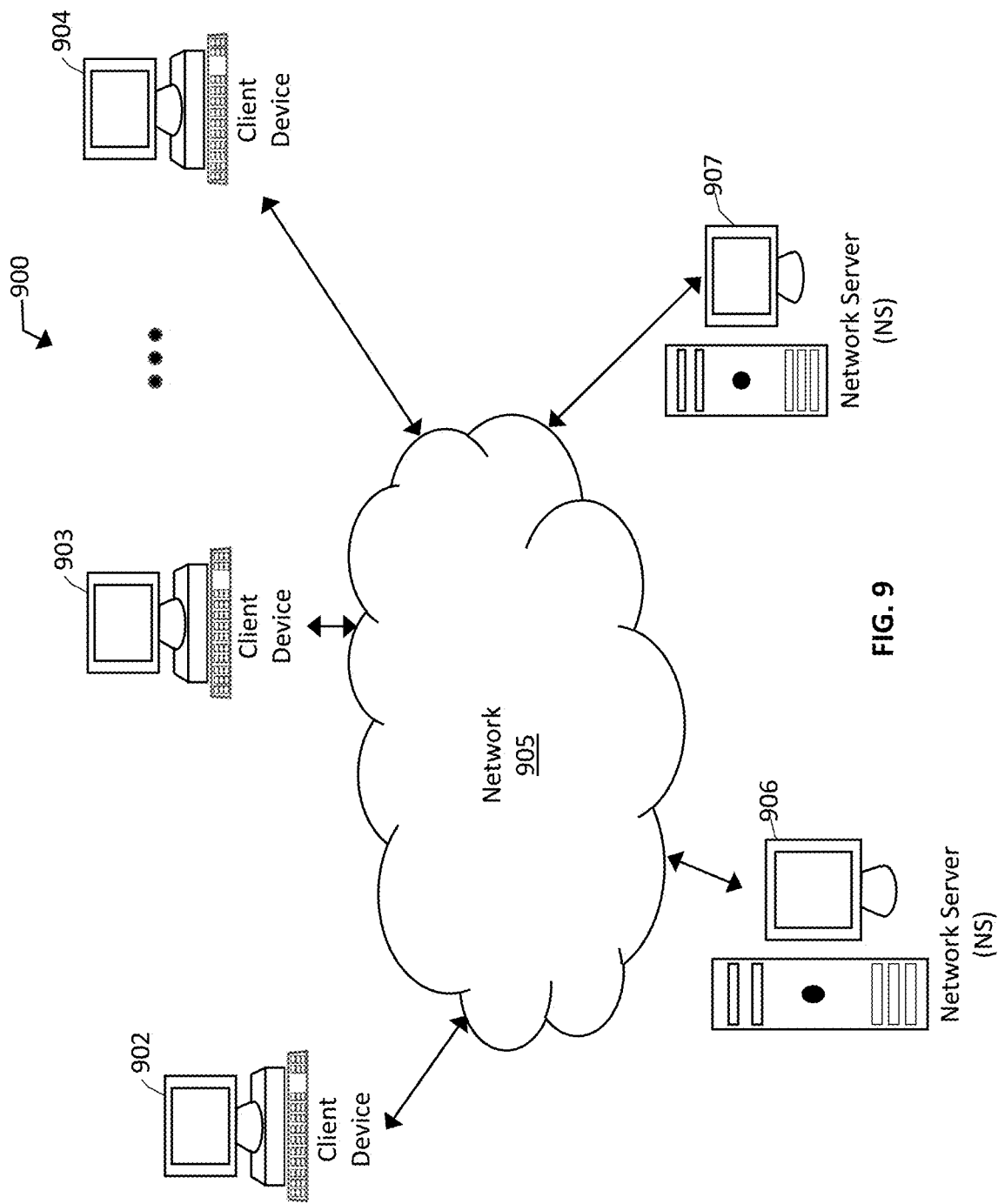
FIG. 9 is a diagrammatic illustration of a high-level connected systems architecture for implementing processes in accordance with aspects of the present disclosure.

FIG. 9 depicts a block diagram of an exemplary computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 900 may be configured to manage a large number of members and concurrent transactions, as detailed herein. In some embodiments, the exemplary computer-based system and platform 900 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 9, client device 902, client device 903 through client device 904 (e.g., clients) of the exemplary computer-based system and platform 900 may include virtually any computing device capable of receiving and sending a message over a network (e.g., cloud network), such as network 905, to and from another computing device, such as servers 906 and 907, each other, and the like. In some embodiments, the member devices 902-904 may be personal computers, multiprocessor systems, microprocessor-based or programmable consumer electronics, network PCs, and the like. In some embodiments, one or more member devices within member devices 902-904 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 902-904 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 902-904 may include may run one or more applications, such as Internet browsers, mobile applications, voice calls, video games, videoconferencing, and email, among others. In some embodiments, one or more member devices within member devices 902-904 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 902-904 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 902-904 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 905 may provide network access, data transport and/or other services to any computing device coupled to it. In some embodiments, the exemplary network 905 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 905 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 905 may include and implement, as an alternative or in conjunction with one or more of the above, a WiMAX architecture defined by the WiMAX forum. In some embodiments and, optionally, in combination of any embodiment described above or below, the exemplary network 905 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 905 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 905 may also include mass storage, such as network attached storage (NAS), a storage area network (SAN), a content delivery network (CDN) or other forms of computer or machine readable media.

In some embodiments, the exemplary server 906 or the exemplary server 907 may be a web server (or a series of servers) running a network operating system, examples of which may include but are not limited to Apache on Linux or Microsoft IIS (Internet Information Services). In some embodiments, the exemplary server 906 or the exemplary server 907 may be used for and/or provide cloud and/or network computing. Although not shown in FIG. 9, in some embodiments, the exemplary server 906 or the exemplary server 907 may have connections to external systems like email, SMS messaging, text messaging, ad content providers, etc. Any of the features of the exemplary server 906 may be also implemented in the exemplary server 907 and vice versa.

In some embodiments, one or more of the exemplary servers 906 and 907 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers or any similarly suitable service-base servers for users of the client devices 901-904.

Figure 10:
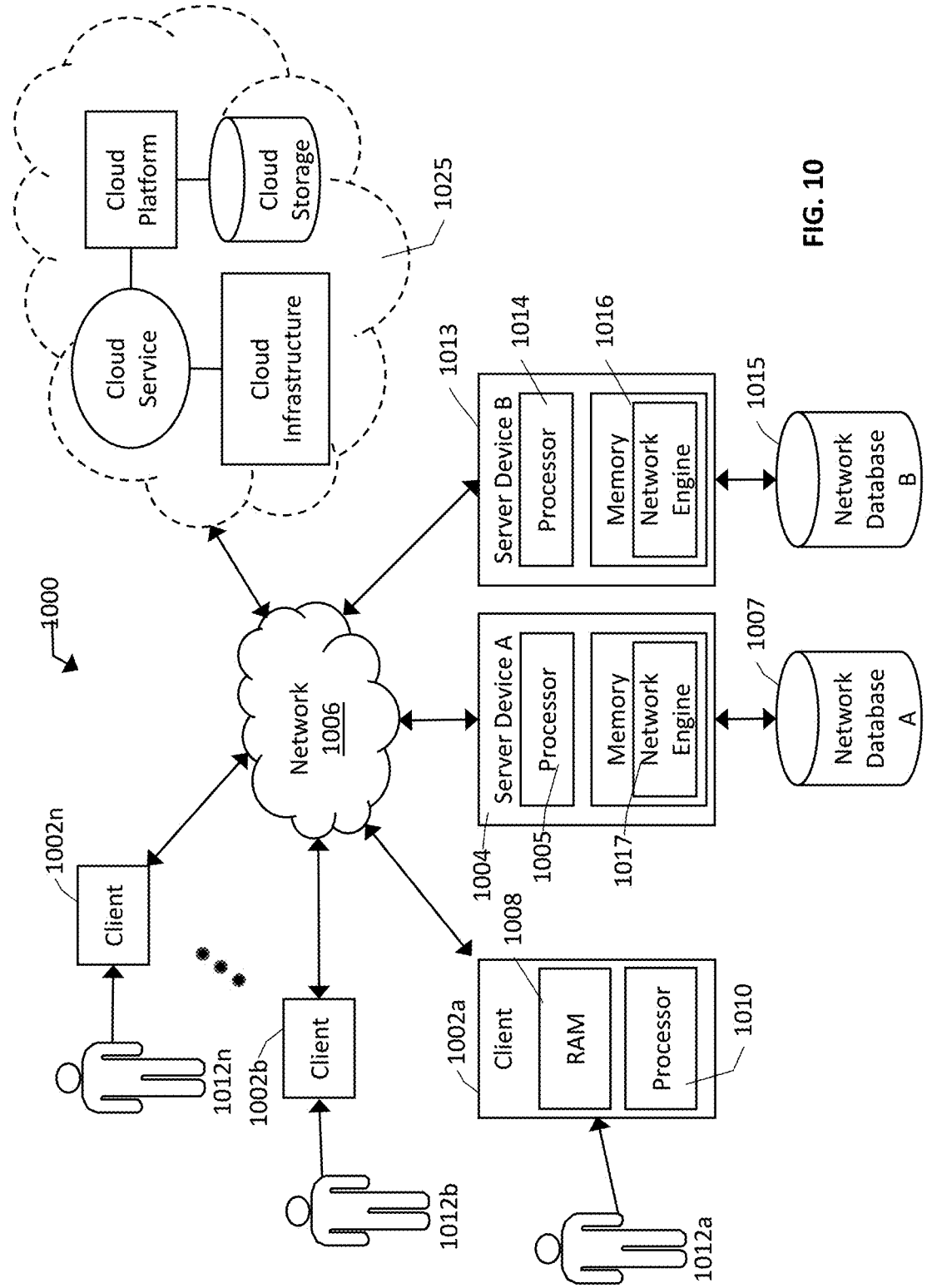
FIG. 10 is a diagrammatic illustration of another high-level connected systems architecture for implementing processes in accordance with aspects of the present disclosure.

In some embodiments and, optionally, in combination of any embodiment described above or below, for example, one or more exemplary computing member devices 902-904, the exemplary server 906, and/or the exemplary server 907 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof. In some embodiments, the messages can be received on cell phone or tablet applications written by or for Clarapath to improve user experience, FIG. 10 depicts a block diagram of another exemplary computer-based system and platform 1000 in accordance with one or more embodiments of the present disclosure.

However, not all of these components may be required to practice one or more embodiments, and variations in the arrangement and type of the components may be made without departing from the spirit or scope of various embodiments of the present disclosure. In some embodiments, the client device 1002a, client device 1002b through client device 1002n shown each at least includes a computer-readable medium, such as a random-access memory (RAM) 1008 coupled to a processor 1010 or FLASH memory. In some embodiments, the processor 1010 may execute computer-executable program instructions stored in memory 1008. In some embodiments, the processor 1010 may include a microprocessor, an ASIC, and/or a state machine. In some embodiments, the processor 1010 may include, or may be in communication with, media, for example computer-readable media, which stores instructions that, when executed by the processor 1010, may cause the processor 1010 to perform one or more steps described herein. In some embodiments, examples of computer-readable media may include, but are not limited to, an electronic, optical, magnetic, or other storage or transmission device capable of providing a processor, such as the processor 1010 of client device 1002a, with computer-readable instructions. In some embodiments, other examples of suitable media may include, but are not limited to, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, PHP, HTML, JavaScript, and etc.

In some embodiments, client devices 1002a through 1002n may also comprise a number of external or internal devices such as a mouse, a CD-ROM, DVD, a physical or virtual keyboard, a display, or other input or output devices. In some embodiments, examples of client devices 1002a through 1002n (e.g., clients) may be any type of processor-based platforms that are connected to a network 1006 such as, without limitation, personal computers, digital assistants, personal digital assistants, smart phones, pagers, digital tablets, laptop computers, Internet appliances, and other processor-based devices. In some embodiments, client devices 1002a through 1002n may be specifically programmed with one or more application programs in accordance with one or more principles/methodologies detailed herein. In some embodiments, client devices 1002a through 1002n may operate on any operating system capable of supporting a browser or browser-enabled application, such as Microsoft™, Windows™, and/or Linux. In some embodiments, client devices 1002a through 1002n shown may include, for example, personal computers executing a browser application program such as Google Chrome browser, Internet Explorer™ or Edge, Apple Computer, Inc.'s Safari™, Mozilla Firefox, Opera, etc. In some embodiments, through the client devices 1002a through 1002n, user 1012a, user 1012b through user 1012n, may communicate over the exemplary network 1006 with each other and/or with other systems and/or devices coupled to the network 1006. As shown in FIG. 10, exemplary server devices 1004 and 1013 may include processor 1005 and processor 1014, respectively, as well as memory 1017 and memory 1016, respectively. In some embodiments, the server devices 1004 and 1013 may be also coupled to the network 1006. In some embodiments, one or more client devices 1002a through 1002n may be mobile clients.

In some embodiments, at least one database of exemplary databases 1007 and 1015 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 11:
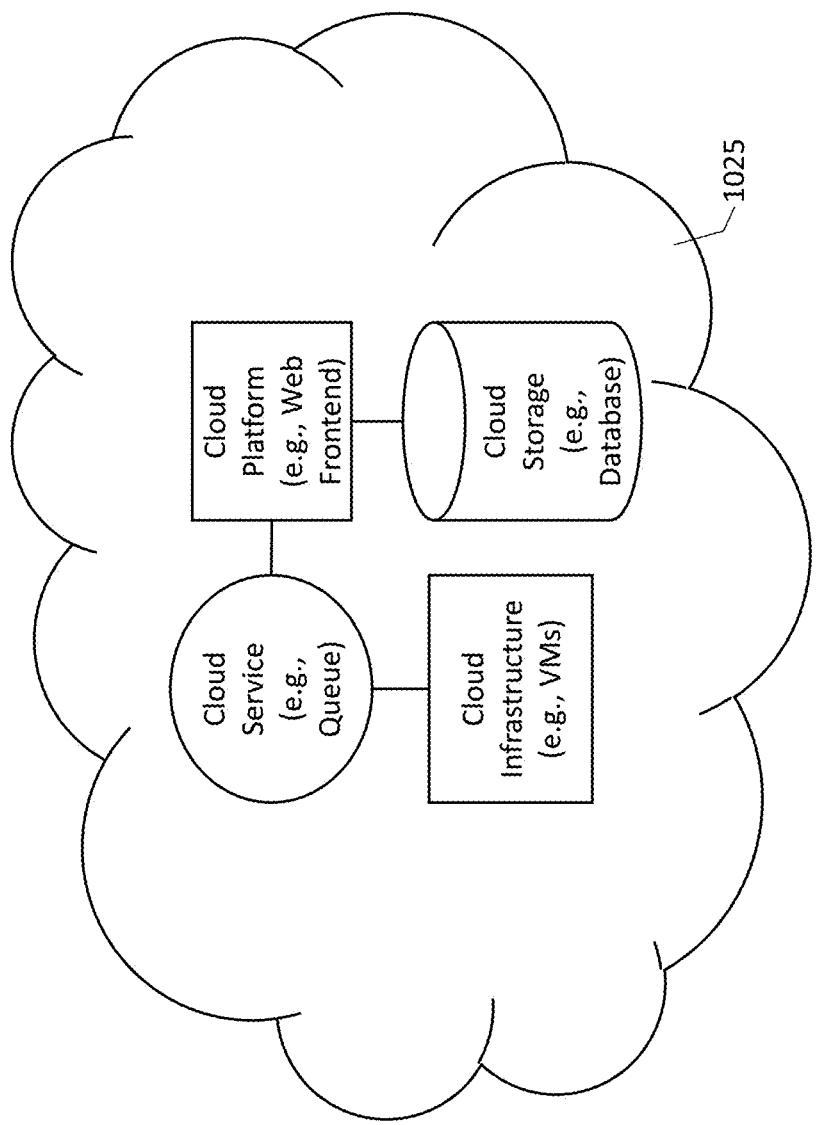
FIG. 11 is a diagrammatic illustration of another high-level connected systems architecture for implementing processes in accordance with aspects of the present disclosure.
Figure 12:
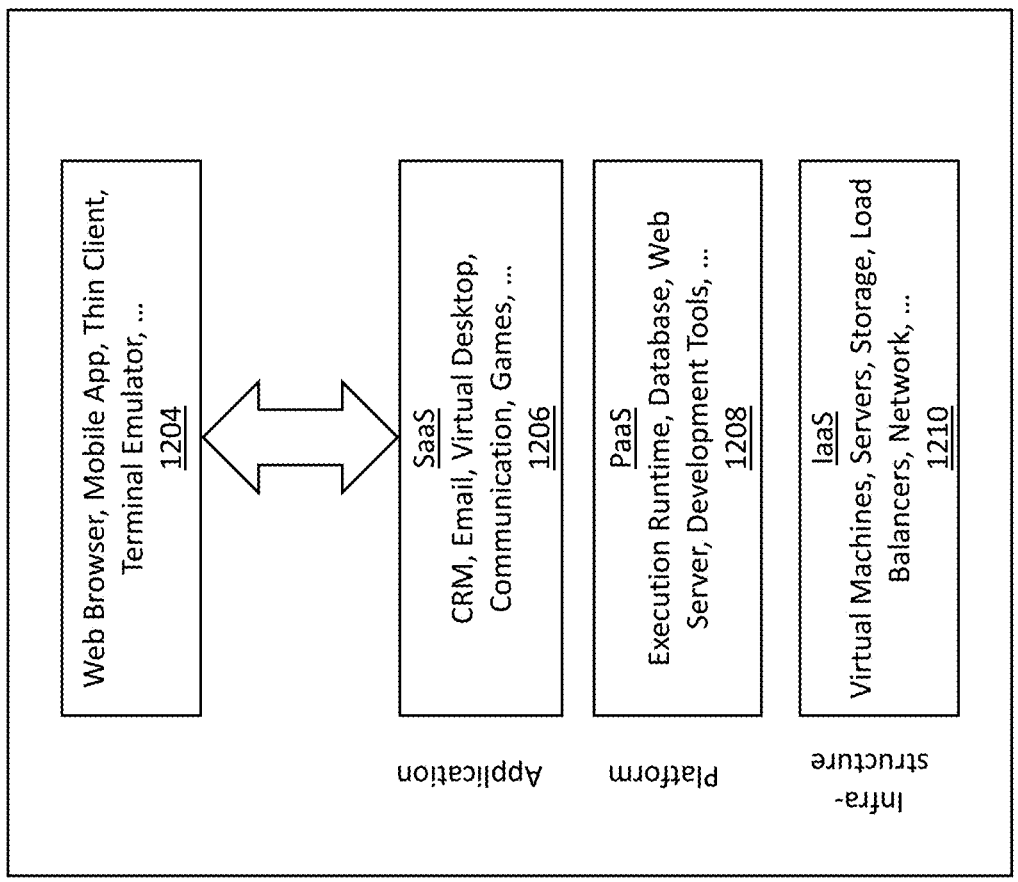
FIG. 12 is a diagrammatic illustration of another high-level connected systems architecture for implementing processes in accordance with aspects of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 1025 such as, but not limiting to: infrastructure a service (IaaS) 1210, platform as a service (PaaS) 1208, and/or software as a service (SaaS) 1206 using a web browser, mobile app, thin client, terminal emulator or other endpoint 1204. FIGS. 11 and 12 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., an image analysis of the tissue image after a tissue is placed on a slide) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, OFDM, OFDMA, LTE, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, PHP, HTML, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users and/or concurrent tissue processing systems that may be, but is not limited to, at least 100 (e.g., but not limited to, 100-999), at least 1,000

(e.g., but not limited to, 1,000-9,999), at least 10,000 (e.g., but not limited to, 10,000-99,999), at least 100,000 (e.g., but not limited to, 100,000-999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application such as Virtual Reality (VR) googles.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added, and/or any desired steps may be eliminated).

What is claimed is:

1. A system comprising:
   one or more tissue processing components configured to produce one or more tissue sections from a tissue block and to transfer the one or more tissue sections from the tissue block to one or more slides; and
   at least one control device in communication with a Laboratory Information Management System (LIMS), wherein the at least one control device is configured to:
      query the LIMS with a sample identifier associated with a tissue sample block and receive tissue sample data from the LIMS;
      generate tissue processing workflow parameters based on the tissue sample data received from the LIMS for each tissue processing component to perform an automated tissue processing workflow;
      automatically control each tissue processing component according to the tissue processing workflow parameters to process the tissue sample block;
      generate at least one block processing update message while the tissue sample block is processed; and
      communicating the at least one block processing update message to the LIMS so as to enable the LIMS to track the automated tissue processing workflow associated with the tissue sample block.

2. The system of claim 1, wherein the tissue processing workflow parameters comprise at least one sensitivity parameter defining a sensitivity of the tissue sample block; and
   wherein the at least one sensitivity parameter is configured to cause the at least one control device to control the one or more tissue processing components to handle the tissue sample block according to the sensitivity of the tissue sample block.

3. The system of claim 1, further comprising at least one sensor device configured to measure operation of the one or more tissue processing components during processing of the tissue sample block throughout the automated tissue processing workflow, wherein the at least one control device is further configured to:
   receive sensor data representing the operation of the one or more tissue processing components from the at least one sensor device;
   determine a processing status of the tissue sample block based at least in part on the tissue processing workflow parameters and the sensor data; and
   generate the at least one block processing update message comprising the processing status.

4. The system of claim 1, wherein the at least one control device is at least one of:
   i) at least one integrated control device integrated into a tissue processing device comprising the one or more tissue processing components,
   ii) at least one workstation control device of a workstation connected to the tissue processing device, or
   iii) a plurality of control devices having a combination of the at least one integrated control device and the at least one workstation control device.

5. A system comprising:
   one or more tissue processing components configured to produce one or more tissue sections from a tissue block and to transfer the one or more tissue sections from the tissue block to one or more slides; and
   at least one control device connected to a network, wherein the at least one control device is configured to:
      log tissue processing component operational data in an operational data log, wherein the tissue processing component operational data represents indicators of an operational state of the one or more tissue processing components;
      generate workflow progress data for at least one block processing workflow defining control of the one or more tissue processing components for processing at least one block of at least one tissue sample based at least in part on the tissue processing component operational data;
      determine tissue processing component performance based at least in part on the tissue processing component operational data;

determine a tissue processing component operational state based at least in part on at least one of:
the tissue processing component operational data, the workflow progress data, or
the tissue processing component performance;
determine tissue processing component predictive maintenance data indicative of at least one tissue processing component predictive maintenance need based on the tissue processing component operational state; and
communicate a device report to a remote computing system so as to enable the remote computing system to optimize performance of the at least one of the tissue processing components;
wherein the device report comprises at least one of:
the tissue processing component operational data,
the workflow progress data,
the tissue processing component performance,
the tissue processing component operational state, or
the tissue processing component predictive maintenance data.

6. The system of claim 5, wherein the tissue processing component operational data comprises error data indicative of one or more errors in operation of the tissue processing components; and
wherein the at least one control device is further configured to initiate an automated debugging process based on the one or more errors.

7. The system of claim 5, wherein the at least one control device is further configured to:
identify a normal operation state indicative of normal operation of the tissue processing components of the one or more tissue processing components; and
determine at least one optimization parameter configured to optimize the tissue processing components based at least in part on the normal operation state and at least one of:
the tissue processing component operational data, or
the tissue processing component performance.

8. A method comprising:
querying, by at least one control device associated with a tissue processing system, a Laboratory Information Management System (LIMS) with a sample identifier associated with a tissue sample block and receive tissue sample data from the LIMS;
wherein the tissue processing system is configured to:
use a one or more tissue processing components to produce one or more tissue sections from a tissue block and to transfer the one or more tissue sections from the tissue block to one or more slides;
generating, by the at least one control device, tissue processing workflow parameters based on the tissue sample data received from the LIMS;
wherein the tissue processing workflow parameters define an operational configuration for the one or more tissue processing components to perform an automated tissue processing workflow;
automatically controlling, by the at least one control device, the one or more tissue processing components according to the tissue processing workflow parameters to process the tissue sample block;
generating, by the at least one control device, at least one block processing update message while the tissue sample block is processed, wherein the at least one block processing update message comprises at least one of:
at least one block processing status update,
at least one report,
at least one tissue image or
at least one confirmation; and
communicating, by the at least one control device, the at least one block processing update message to the LIMS so as to enable the LIMS to track the automated tissue processing workflow associated with the tissue sample block.

9. The method of claim 8, wherein the tissue processing workflow parameters comprise at least one sensitivity parameter defining a sensitivity of the tissue sample block; and
wherein the at least one sensitivity parameter is configured to cause the at least one control device to control the one or more tissue processing components to handle the tissue sample block according to the sensitivity of the tissue sample block.

10. The method of claim 8, further comprising:
receiving, by the at least one control device from at least one sensor device associated with the one or more tissue processing components configured to measure operation of the one or more tissue processing components during processing of the tissue sample block throughout the automated tissue processing workflow, sensor data representing the operation of the one or more tissue processing components from the at least one sensor device;
determining, by the at least one control device, a processing status of the tissue sample block based at least in part on the tissue processing workflow parameters and the sensor data; and
generating, by the at least one control device, the at least one block processing update message comprising the processing status.

11. The method of claim 8, wherein the at least one control device is at least one of:
i) at least one integrated control device integrated into a tissue processing device comprising the one or more tissue processing components,
ii) at least one workstation control device of a workstation connected to the tissue processing device, or
iii) a plurality of control devices having a combination of the at least one integrated control device and the at least one workstation control device.

12. A method comprising:
logging, by at least one control device associated with a tissue processing system comprising a one or more tissue processing components to produce one or more tissue sections from a tissue block and to transfer the one or more tissue sections from the tissue block to one or more slides, tissue processing component operational data and an operational data log, wherein the tissue processing component operational data represents indicators of an operational state of a one or more tissue processing components of a one or more tissue processing components associated with the at least one control device;
wherein the at least one control device is connected to a network;
generating, by the at least one control device, workflow progress data for at least one block processing workflow defining control of the one or more tissue processing components of the one or more tissue processing components for processing at least one block of at least one tissue sample based at least in part on the tissue processing component operational data;

determining, by the at least one control device, a tissue processing component performance based at least in part on the tissue processing component operational data;

determining, by the at least one control device, a tissue processing operational state based at least in part on at least one of:
the tissue processing component operational data,
the workflow progress data, or
the tissue processing component performance;

determining, by the at least one control device, tissue processing component predictive maintenance data indicative of at least one tissue processing component predictive maintenance need based on the tissue processing operational state; and communicating, by the at least one control device, a device report to a remote computing system so as to enable the remote computing system to optimize performance of one or more of the tissue processing components;
wherein the device report comprises at least one of:
the tissue processing component operational data,
the workflow progress data,
the tissue processing component performance,
the tissue processing operational state, or
the tissue processing component predictive maintenance data.

13. The method of claim 12, further comprising initiating, by the at least one control device, an automated debugging process based on one or more errors, wherein the tissue processing component operational data comprises error data indicative of the one or more errors in operation of the one or more tissue processing components.

14. The method of claim 13, further comprising:
identifying, by the at least one control device, a normal operation state indicative of normal operation of the one or more tissue processing components of the one or more tissue processing components; and
determining, by the at least one control device, at least one optimization parameter configured to optimize the one or more tissue processing components based at least in part on the normal operation state and at least one of:
the tissue processing component operational data, or
the tissue processing component performance.

15. A non-transitory computer readable medium comprising software instructions configured to cause at least one control device to perform steps for automated control of one or more tissue processing components, the steps comprising:
querying a Laboratory Information Management System (LIMS) with a sample identifier associated with a tissue sample block and receive tissue sample data from the LIMS;
wherein the one or more tissue processing components is configured to produce one or more tissue sections from a tissue block, and to transfer the one or more tissue sections from the tissue block to one or more slides;
generating tissue processing workflow parameters based on the tissue sample data received from the LIMS;
wherein the tissue processing workflow parameters define an operational configuration for the one or more tissue processing components to perform an automated tissue processing workflow;
automatically controlling the one or more tissue processing components according to the tissue processing workflow parameters to process the tissue sample block;
generating at least one block processing update message while the tissue sample block is processed, wherein the at least one block processing update message comprises at least one of:
at least one block processing status update,
at least one report,
at least one tissue image or
at least one confirmation; and
communicating the at least one block processing update message to the LIMS so as to enable the LIMS to track the automated tissue processing workflow associated with the tissue sample block.

16. The non-transitory computer readable medium of claim 15, wherein the tissue processing workflow parameters comprise at least one sensitivity parameter defining a sensitivity of the tissue sample block; and
wherein the at least one sensitivity parameter is configured to cause the at least one control device to control the one or more tissue processing components to handle the tissue sample block according to the sensitivity of the tissue sample block.

17. The non-transitory computer readable medium of claim 15, wherein the steps further comprise:
receiving, from at least one sensor device associated with the one or more tissue processing components configured to measure operation of the one or more tissue processing components during processing of the tissue sample block throughout the automated tissue processing workflow, sensor data representing the operation of the one or more tissue processing components from the at least one sensor device;
determining a processing status of the tissue sample block based at least in part on the tissue processing workflow parameters and the sensor data; and
generating the at least one block processing update message comprising the processing status.

18. A non-transitory computer readable medium comprising software instructions configured to cause at least one control device to perform steps for automated control of a tissue processing system, the steps comprising:
logging tissue processing component operational data and an operational data log, wherein the tissue processing component operational data represents indicators of an operational state of a one or more tissue processing components of a one or more tissue processing components associated with the at least one control device;
wherein the tissue processing system is configured to produce one or more tissue sections from a tissue block, and to transfer the one or more tissue sections from the tissue block to one or more slides;
generating workflow progress data for at least one block processing workflow defining control of the one or more tissue processing components of the one or more tissue processing components for processing at least one block of at least one tissue sample based at least in part on the tissue processing component operational data;
determining tissue processing component performance based at least in part on the tissue processing component operational data;
determine a tissue processing operational state based at least in part on at least one of:
the tissue processing component operational data,
the workflow progress data, or
the tissue processing component performance;
determining tissue processing component predictive maintenance data indicative of at least one tissue processing component predictive maintenance need based on the tissue processing operational state; and communicating a device report via a network to a remote computing system so as to enable the remote computing system to optimize performance of one or more of the tissue processing components;
  wherein the device report comprises at least one of:
    the tissue processing component operational data,
    the workflow progress data,
    the tissue processing component performance,
    the tissue processing operational state, or
    the tissue processing component predictive maintenance data.

19. The non-transitory computer readable medium of claim 18, wherein the tissue processing component operational data comprises error data indicative of one or more errors in operation of the one or more tissue processing components; and wherein the at least one control device is further configured to initiate an automated debugging process based on the one or more errors.

20. The non-transitory computer readable medium of claim 18, wherein the steps further comprise:

identifying a normal operation state indicative of normal operation of the one or more tissue processing components of the one or more tissue processing components; and determining at least one optimization parameter configured to optimize the one or more tissue processing components based at least in part on the normal operation state and at least one of:

the tissue processing component operational data, or the tissue processing component performance.

* * * * *